(12) United States Patent
Akiyama

(10) Patent No.: US 10,564,531 B2
(45) Date of Patent: Feb. 18, 2020

(54) LIGHT SOURCE DEVICE AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 6 days.

(21) Appl. No.: 15/889,843

(22) Filed: Feb. 6, 2018

(65) Prior Publication Data
US 2018/0231881 A1    Aug. 16, 2018

(30) Foreign Application Priority Data

Feb. 14, 2017    (JP) .................. 2017-025078

(51) Int. Cl.
| | | |
|---|---|---|
| G03B 21/20 | (2006.01) | |
| G03B 21/16 | (2006.01) | |
| G03B 33/12 | (2006.01) | |
| G03B 21/00 | (2006.01) | |

(52) U.S. Cl.
CPC .......... *G03B 21/204* (2013.01); *G03B 21/16* (2013.01); *G03B 21/208* (2013.01); *G03B 21/2066* (2013.01); *G03B 21/006* (2013.01); *G03B 33/12* (2013.01)

(58) Field of Classification Search
CPC ..... H01L 33/50; H01L 33/502; H01L 33/504; H01L 33/505; F21K 9/64; G03B 21/204; F21S 41/176; F21V 9/30; F21V 13/14
See application file for complete search history.

(56) References Cited

U.S. PATENT DOCUMENTS

| | | | | |
|---|---|---|---|---|
| 2010/0091491 A1* | 4/2010 | Jiang | ......................... | F21V 5/04 362/235 |
| 2012/0106126 A1* | 5/2012 | Nojima | ................ | G02B 26/008 362/84 |
| 2012/0224378 A1* | 9/2012 | Koike | ................ | C09K 11/7774 362/259 |
| 2013/0250546 A1* | 9/2013 | Hu | ............................ | F21V 9/40 362/84 |
| 2015/0109773 A1* | 4/2015 | Li | ........................... | F21V 5/007 362/231 |
| 2017/0227176 A1* | 8/2017 | Inoue | ....................... | F21K 9/64 |

FOREIGN PATENT DOCUMENTS

| | | |
|---|---|---|
| JP | 2012-098442 A | 5/2012 |
| JP | 2012-169049 A | 9/2012 |
| WO | 2012/0108291 A1 | 8/2012 |

* cited by examiner

*Primary Examiner* — Cara E Rakowski
*Assistant Examiner* — Christopher A Lamb, II
(74) *Attorney, Agent, or Firm* — Oliff PLC

(57) ABSTRACT

A light source device of the invention includes an excitation light source, a wavelength conversion layer having a light incident surface and a light exiting surface, a reflection member, and a pickup system, wherein the light exiting surface at least has a first light exiting surface with a tilt with respect to an optical axis of the pickup system and a second light exiting surface with a tilt with respect to the first light exiting surface, the reflection member has a reflection surface along the optical axis of the pickup system and an end portion on the pickup system side extends closer to the pickup system than the light exiting surface, and a focal point of the pickup system is formed on a plane crossing the optical axis of the pickup system and containing the end portion of the reflection member.

15 Claims, 11 Drawing Sheets

LIGHT SOURCE DEVICE AND PROJECTOR

BACKGROUND

1. Technical Field

The present invention relates to a light source device and projector.

2. Related Art

As light sources used for projectors etc., light source devices that irradiate fluorescent materials with excitation lights output from light sources such as semiconductor lasers and use fluorescent lights obtained from the fluorescent materials are proposed (for example, Patent Document 1 (JP-A-2012-169049), Patent Document 2 (JP-A-2012-98442)).

Patent Document 1 discloses a light source device that may suppress the amount of use of a fluorescent material to be lower without using a color wheel and may be downsized without a complex unit such as a rotation mechanism.

Patent Document 2 discloses a configuration in which a fluorescent material layer is provided on a wheel substrate including a transparent member and the distance between the first side surface and the second side surface of the fluorescent material layer is made larger from the light incident surface of the excitation light toward the light exiting surface of the fluorescent light.

In the case of a projector that obtains a fluorescent light by a wavelength conversion layer (fluorescent material) using a semiconductor layer as an excitation light and uses at least the fluorescent light as a light source, if the light emission area of the wavelength conversion layer is increased, the amount of light from the light source (the amount of light of the fluorescent light) may be increased, however, etendue of the light source increases.

As described above, if the invention described in Patent Document 2 is applied to the invention described in Patent Document 1, the area of the light emission area (light emission area) increases, however, the etendue also increases and efficiency in the optical system provided at the downstream of the light source device may be deteriorated.

SUMMARY

An advantage of some aspects of the invention is to provide a light source device in which extraction efficiency of light from a wavelength conversion element is improved without increase in etendue. Another advantage of some aspects of the invention is to provide a projector including a light source device with improved extraction efficiency of light from a wavelength conversion element.

Alight source device according to an aspect of the invention includes an excitation light source that outputs an excitation light, a wavelength conversion layer having a light incident surface into which the excitation light enters and a light exiting surface that at least outputs a fluorescent light formed by wavelength conversion of the excitation light, a reflection member that reflects the light output from the light exiting surface, and a pickup system that parallelizes the fluorescent light output from the wavelength conversion layer, wherein the light exiting surface at least has a first light exiting surface with a tilt with respect to an optical axis of the pickup system and a second light exiting surface with a tilt with respect to the first light exiting surface, the reflection member has a reflection surface along the optical axis of the pickup system and an end portion on the pickup system side extends closer to the pickup system than the light exiting surface, and a focal point of the pickup system is formed on a plane crossing the optical axis of the pickup system and containing the end portion of the reflection member.

According to this configuration, the focal point of the pickup system is formed on the plane containing the end portion of the reflection member, and thereby, even when the area of the light exiting surface is made larger than the area of the light incident surface, a secondary light source image formed on the plane is not larger than the light incident surface. That is, the secondary light source size as seen from the pickup system is unchanged and the same as that when the light exiting surface is not increased, and etendue does not increase. Therefore, according to the embodiment, the light exiting surface of the wavelength conversion layer may be increased without increase in etendue and extraction efficiency of light from the wavelength conversion element may be improved. Further, the end portion of the reference member is projected closer to the pickup system than the light exiting surface of the wavelength conversion layer and a light tunnel structure is formed, and thereby, use efficiency of light in the downstream pickup system is improved.

In the light source device according to the aspect of the invention, a heat dissipation member may be provided on an opposite side of the reflection member to the wavelength conversion layer in a direction crossing the optical axis of the pickup system, the wavelength conversion layer may have a connecting surface connecting the light incident surface and the light exiting surface, and at least a part of the reflection surface of the reflection member may be provided in contact with the connecting surface.

According to this configuration, the connecting surface of the wavelength conversion layer is provided in contact with the reflection member, and heat generated in the wavelength conversion layer may be efficiently dissipated and reduction of conversion efficiency of the wavelength conversion layer may be suppressed.

In the light source device according to the aspect of the invention, a light-transmissive member may be provided in contact with the light incident surface between the excitation light source and the wavelength conversion layer.

According to this configuration, the heat generated in the wavelength conversion layer may be efficiently dissipated via the light-transmissive member, and reduction of conversion efficiency of the wavelength conversion layer may be suppressed.

In the light source device according to the aspect of the invention, one of the first light exiting surface and the second light exiting surface may cross the optical axis.

According to this configuration, the light exiting surface crossing the optical axis faces the pickup system and the output light is output toward the pickup system. Accordingly, the light output from the light exiting surface may be directly entered into the pickup system. The light output from the light exiting surface having the tilt with respect to the optical axis is reflected in the reflection member, then, output toward the pickup system side, and enters the pickup system.

In the light source device according to the aspect of the invention, the other of the first light exiting surface and the second light exiting surface may be along the optical axis.

According to this configuration, the light output from the second light exiting surface may be re-entered into the wavelength conversion layer in the reflection member (reflection surface), and thereby, the area of the light exiting surface may be increased without increase in etendue and the extraction efficiency of light from the wavelength conversion layer may be improved.

In the light source device according to the aspect of the invention, the wavelength conversion layer may have a third light exiting surface with a tilt with respect to at least one of the first light exiting surface and the second light exiting surface.

According to this configuration, the area of the light exiting surface may be increased without increase in etendue and the extraction efficiency of light from the wavelength conversion layer may be improved.

In the light source device according to the aspect of the invention, the third light exiting surface may cross the optical axis of the pickup system, face the light incident surface, and coincide with the plane containing the end portion of the reflection member.

According to this configuration, the area of the light exiting surface may be increased without increase in etendue and the extraction efficiency of light from the wavelength conversion layer may be improved.

A projector according to an aspect of the invention includes the light source device described above, a light modulation device that modulates a light output from the light source device according to image information and generates an image light, and a projection system that projects the image light.

According to this configuration, the light source device with improved extraction efficiency of light from the wavelength conversion layer is provided, and thereby, the projector having higher use efficiency of light relative to input power may be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
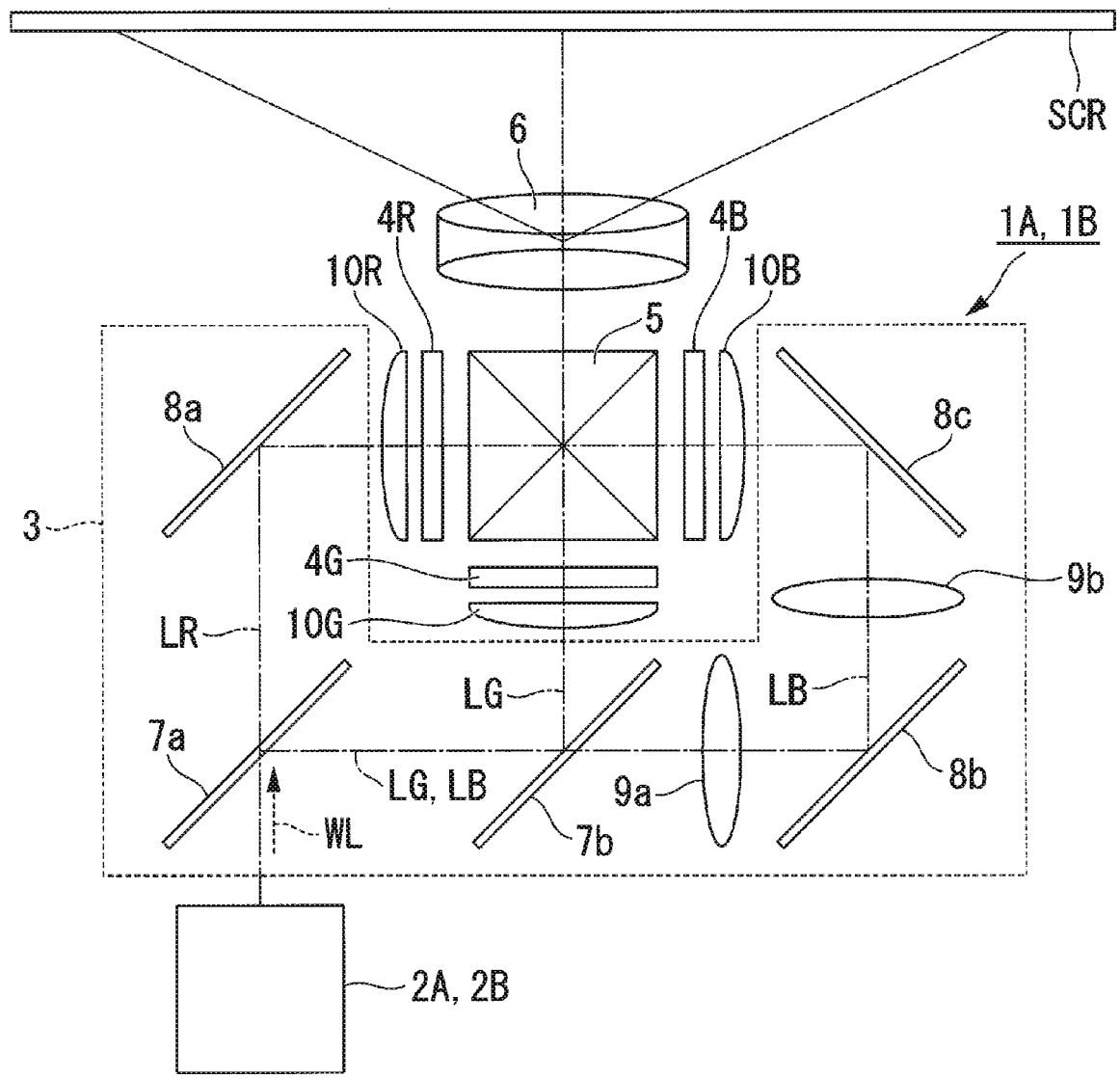
FIG. 1 is a schematic configuration diagram showing a projector 1A in a first embodiment and a projector 1B in a sixth embodiment.

As below, embodiments of the invention will be explained in detail with reference to the respective drawings.

Note that, in the drawings used in the following description, for ease of understanding of the features, the characteristic parts may be enlarged for convenience and the dimension ratios between the respective component elements are not necessarily the same as those of real ones.
Projector of First Embodiment A projector 1A of this embodiment is an example of a projector using three transmissive liquid crystal light valves as light modulation devices. Note that, as the light modulation devices, reflective liquid crystal light valves may be used. Further, other light modulation devices including devices using micromirrors e.g. DMDs (Digital Micromirror Devices) or the like than the liquid crystal devices may be used.

FIG. 1 is a schematic configuration diagram showing the projector 1A in the first embodiment.

As shown in FIG. 1, the projector 1A includes a light source device 2A, a color separation system 3, a light modulation device 4R, a light modulation device 4G, a light modulation device 4B, a color combining system 5, and a projection system 6. The light source device 2A outputs an illumination light WL. The color separation system 3 separates the illumination light WL from the light source device 2A into a red light LR, a green light LG, and a blue light LB. The light modulation device 4R, the light modulation device 4G, and the light modulation device 4B modulate the red light LR, the green light LG, and the blue light LB according to image information, respectively, and form image lights of the respective colors. The color combining system 5 combines the image lights of the respective colors from the respective light modulation devices 4R, 4G, 4B. The projection system 6 projects the combined image light from the color combining system 5 toward a screen SCR.

Figure 2:
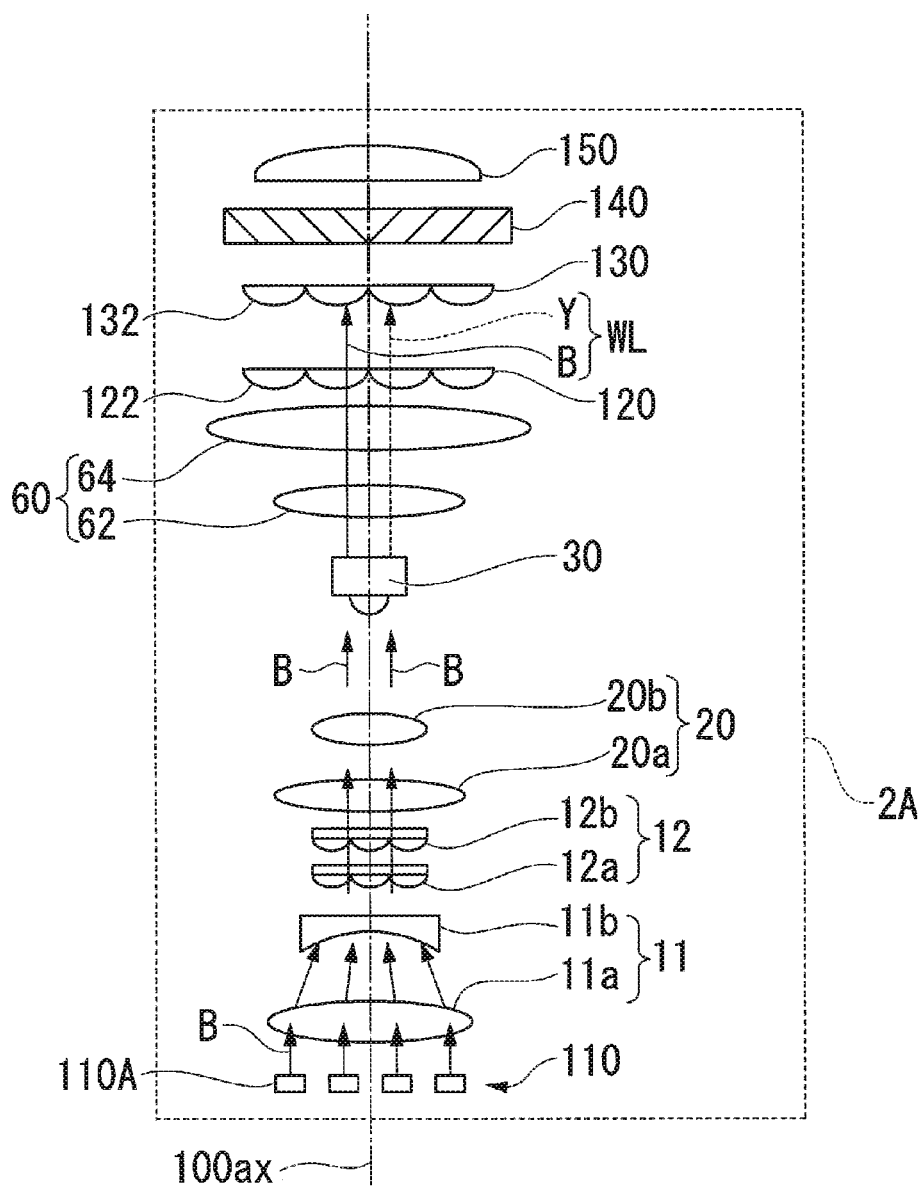
FIG. 2 shows a schematic configuration of a light source device 2A in the first embodiment.

As shown in FIG. 2, the light source device 2A outputs the white illumination light (white light) WL formed by combination of part of a blue excitation light B output with unconverted wavelength of the blue excitation light B output from the semiconductor laser and a yellow fluorescent light Y generated by wavelength conversion of the excitation light by a wavelength conversion element 30. The light source device 2A outputs the illumination light WL adjusted to have a nearly uniform illuminance distribution toward the color separation system 3. The specific configuration of the light source device 2A will be described later.

As shown in FIG. 1, the color separation system 3 includes a first dichroic mirror 7a, a second dichroic mirror 7b, a first reflection mirror 8a, a second reflection mirror 8b, a third reflection mirror 8c, a first relay lens 9a, and a second relay lens 9b.

The first dichroic mirror 7a separates the illumination light WL output from the light source device 2A into the red light LR and a light of a mixture of the green light LG and the blue light LB. For the purpose, the first dichroic mirror 7a has a property of transmitting the red light LR and reflecting the green light LG and the blue light LB. The second dichroic mirror 7b separates the light of the mixture of the green light LG and the blue light LB into the green light LG and the blue light LB. For the purpose, the second dichroic mirror 7b has a property of reflecting the green light LG and transmitting the blue light LB.

The first reflection mirror 8a is provided in the optical path of the red light LR and reflects the red light LR transmitted through the first dichroic mirror 7a toward the light modulation device 4R. The second reflection mirror 8b and the third reflection mirror 8c are provided in the optical path of the blue light LB and guides the blue light LB transmitted through the second dichroic mirror 7b to the light modulation device 4B.

The first relay lens 9a and the second relay lens 9b are provided at the downstream of the second dichroic mirror 7b in the optical path of the blue light LB. The first relay lens 9a and the second relay lens 9b compensate for the light loss of the blue light LB due to the optical path length of the blue light LB longer than the optical path lengths of the red light LR and the green light LG.

The respective light modulation device 4R, light modulation device 4G, and light modulation device 4B include liquid crystal panels. The respective light modulation device 4R, light modulation device 4G, and light modulation device 4B modulate the respective red light LR, green light LG, and blue light LB according to image information while passing the respective red light LR, green light LG, and blue light LB, and form image lights corresponding to the respective colors. Polarizers (not shown) are respectively provided on the light-incident sides and the light-exiting sides of the respective light modulation device 4R, light modulation device 4G, and light modulation device 4B.

A field lens 10R, a field lens 10G, and a field lens 10B that parallelize the red light LR, green light LG, and blue light LB entering the light modulation device 4R, light modulation device 4G, and light modulation device 4B, respectively, are provided on the light-incident sides of the respective light modulation device 4R, light modulation device 4G, and light modulation device 4B.

The color combining system 5 includes a cross dichroic prism. The color combining system 5 combines the images of the respective colors from the respective light modulation device 4R, light modulation device 4G, and light modulation device 4B, and outputs the combined image light toward the projection system 6.

The projection system 6 includes a group of projection lenses. The projection system 6 enlarges and projects the image light combined by the color combining system 5 toward the screen SCR. Thereby, an enlarged color picture (image) is displayed on the screen SCR.

Light Source Device

Next, the configuration of the light source device 2A of the first embodiment will be explained.

FIG. 2 shows a schematic configuration of the light source device 2A in the first embodiment.

As shown in FIG. 2, the light source device 2A includes an excitation light source 110, an afocal system 11, a homogenizer system 12, a collecting system 20, the wavelength conversion element 30, a pickup system 60, a first lens array 120, a second lens array 130, a polarization conversion element 140, and a superimposing lens 150.

The excitation light source 110 includes a plurality of semiconductor lasers 110A that output blue excitation lights B of laser beams. The peak of the light emission intensity of the excitation light B is e.g. 445 nm. The plurality of semiconductor lasers 110A are arranged in an array form within one plane orthogonal to an illumination light axis 100ax. Note that, as the excitation light source 110, semiconductor lasers that output blue lights having other wavelengths e.g. 455 nm or 460 nm than 445 nm may be used. Or, as the excitation light source 110, not limited to the semiconductor laser diodes, but LEDs (Light Emitting Diodes) may be used.

The afocal system 11 includes e.g. a convex lens 11a and a concave lens 11b. The afocal system 11 reduces the diameter of a luminous flux of a plurality of laser beams output from the excitation light source 110. Note that a collimator system may be provided between the afocal system 11 and the excitation light source 110 to convert the excitation light entering the afocal system 11 into a parallel luminous flux.

The homogenizer system 12 includes e.g. a first multi-lens array 12a and a second multi-lens array 12b. The homogenizer system 12 sets the light intensity distribution of the excitation light to a homogeneous state on a wavelength conversion layer, which will be described later, the so-called top-hat distribution. The homogenizer system 12 superimposes a plurality of small luminous fluxes output from the plurality of lenses of the first multi-lens array 12a and the second multi-lens array 12b on each other on the wavelength conversion layer with the collecting system 20. Thereby, the light intensity distribution of the excitation light B radiated onto the wavelength conversion layer is homogenized.

The collecting system 20 includes e.g. a first lens 20a and a second lens 20b. The collecting system 20 is provided in an optical path from the homogenizer system 12 to the wavelength conversion element 30, collects and enters the excitation light B into the wavelength conversion layer of the wavelength conversion element 30. In the embodiment, the first lens 20a and the second lens 20b are respectively formed using convex lenses.

The pickup system 60 includes e.g. a first collimating lens 62 and a second collimating lens 64. The pickup system 60 nearly parallelizes the light output from the wavelength conversion element 30. The first collimating lens 62 and the second collimating lens 64 are respectively formed using convex lenses.

The first lens array 120 has a plurality of first lenses 122 for dividing the light output from the pickup system 60 into a plurality of partial luminous fluxes. The plurality of first lenses 122 are arranged in a matrix form within a plane orthogonal to the illumination light axis 100ax.

The second lens array 130 has a plurality of second lenses 132 corresponding to the plurality of first lenses 122 of the first lens array 120. The second lens array 130 forms images of the respective first lenses 122 of the first lens array 120 near the image formation areas of the light modulation device 4R, the light modulation device 4G, and the light modulation device 4B with the superimposing lens 150. The plurality of second lenses 132 are arranged in a matrix form within a plane orthogonal to the illumination light axis 100ax.

The polarization conversion element 140 converts the lights output from the second lens array 130 into linearly-polarized lights. The polarization conversion element 140 includes e.g. a polarization separation layer and a wave plate (both not shown).

The superimposing lens 150 collects and superimposes the respective partial luminous fluxes output from the polarization conversion element 140 near the image formation areas of the light modulation device 4R, the light modulation device 4G, and the light modulation device 4B.

Wavelength Conversion Element

Next, a configuration of the wavelength conversion element in the first embodiment will be explained.

Figure 3:
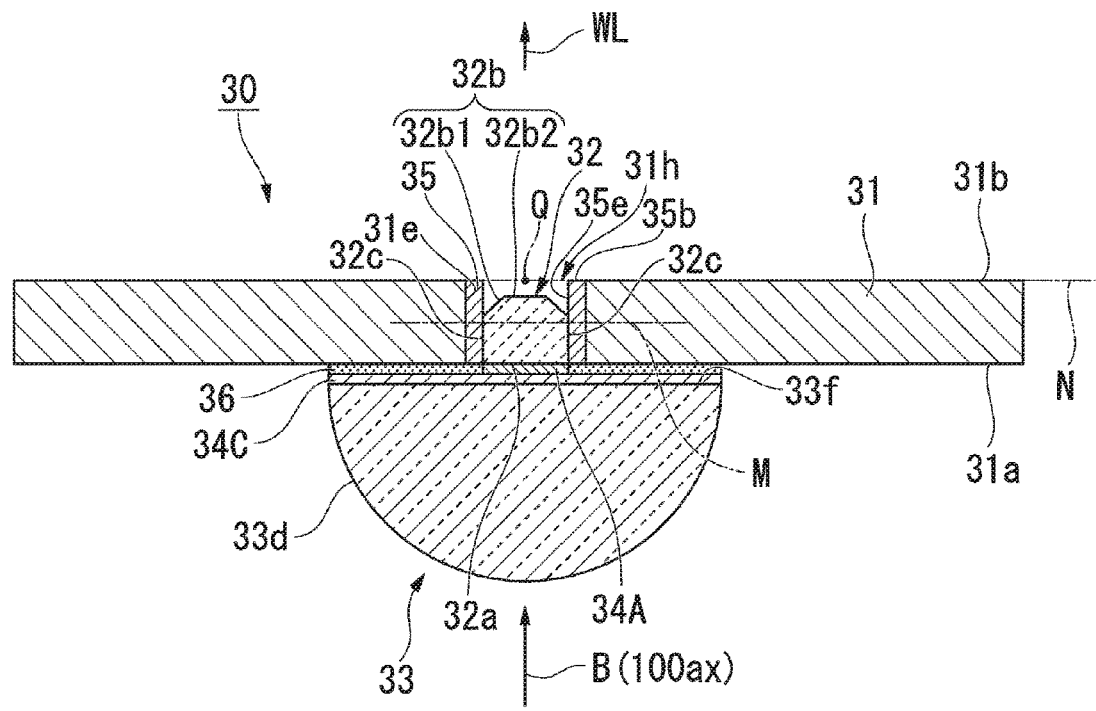
FIG. 3 is a sectional view of a wavelength conversion element 30 in the first embodiment cut along a plane containing an illumination light axis 100ax.
Figure 4:
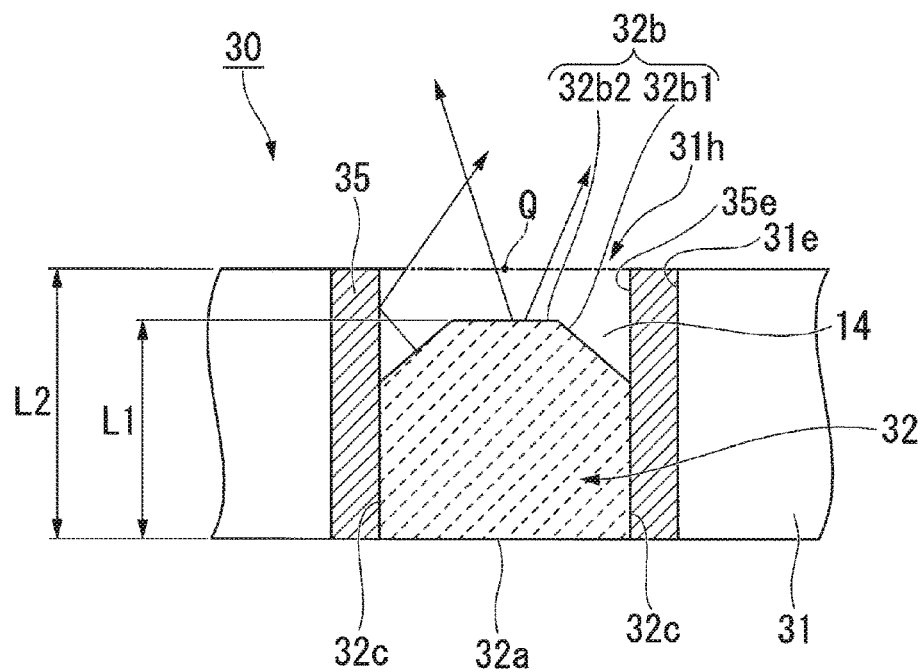
FIG. 4 is a diagram for explanation of optical paths of lights output from the wavelength conversion element 30 in the first embodiment.

FIG. 3 is a sectional view of the wavelength conversion element 30 in the first embodiment cut along a plane containing the illumination light axis 100ax in FIG. 2. FIG. 4 is a diagram for explanation of optical paths of the lights output from the wavelength conversion element 30 in the first embodiment.

As shown in FIG. 3, the wavelength conversion element 30 mainly includes a support member (heat dissipation member) 31, a light-transmissive member 33, a reflection film (reflection member) 35, and a wavelength conversion layer 32.

The support member 31 is formed using a rectangular plate material and has a first surface 31a and a second surface 31b facing each other in the direction of the plate thickness. The pickup system 60 is provided on the side of the second surface 31b of the support member 31. In the support member 31, a hole 31h penetrating in the thickness direction between the first surface 31a and the second surface 31b is provided. The shape of the hole 31h is rectangular as seen from the normal direction of the first surface 31a.

The support member 31 may be formed using a material with light transmissivity such as glass or quartz, or may be formed using a material without light transmissivity such as metal. In the case of the metal material, a metal with a good heat dissipation property such as aluminum or copper is desirably used.

The wavelength conversion layer 32 is provided and supported inside of the hole 31h of the support member 31. The shape of the wavelength conversion layer 32 is rectangular as seen from the normal direction of a light exiting surface 32b of the wavelength conversion layer 32. The wavelength conversion layer 32 contains fluorescent material particles (not shown) that convert and output the blue excitation light B into the yellow fluorescent light Y.

The wavelength conversion layer 32 has a light incident surface 32a that the excitation light B output from the excitation light source 110 enters and crosses the optical axis of the excitation light B, the light exiting surface 32b facing the light incident surface 32a, and connecting surfaces 32c that connect the light incident surface 32a and the light exiting surface 32b. The connecting surfaces 32c are in contact with the reflection film 35 provided on an inner peripheral surface 31e of the hole 31h of the support member 31. The light incident surface 32a is located on the same plane as the first surface 31a of the support member 31, and the light exiting surface 32b is located within the hole 31h closer to the first surface 31a than the second surface 31b of the support member 31.

As shown in FIG. 4, a length L1 of the wavelength conversion layer 32 in the optical axis direction is set to be shorter than a length L2 of the reflection film 35 in the optical axis direction, and set to a dimension such that the reflection film 35, which will be described later, is exposed within the hole 31h of the support member 31.

The light exiting surface 32b of the embodiment has a first light exiting surface 32b1 with a tilt with respect to the light incident surface 32a and a tilt with respect to the optical axis of the pickup system 60, and a second light exiting surface 32b2 with a tilt with respect to the first light exiting surface 32b1. Specifically, the second light exiting surface 32b2 faces the light incident surface 32a and crosses the optical axis of the pickup system 60. The first light exiting surface 32b1 is a surface tilted in a direction away from the reflection film 35 toward the pickup system 60 side. The area of the light exiting surface 32b including a convex bending surface is larger than the area of the light incident surface 32a of the wavelength conversion layer 32.

In the embodiment, when the center position in the depth direction of the hole 31h with the wavelength conversion layer 32 provided therein (the center position of the support member 31 in the plate thickness direction) is referred to as "reference position M" (see FIG. 3), the light exiting surface 32b (first light exiting surface 32b1 and the second light exiting surface 32b2) is located closer to the light incident surface 32a than an end surface 35b of the reflection film 35 on the light exiting surface 32b side or on the pickup system 60 side and closer to the end surface 35b of the reflection film 35 than the reference position M.

As the fluorescent material particles, e.g. a YAG (yttrium aluminum garnet) fluorescent material is used. Note that a single kind of material forming the fluorescent material particles may be used or mixture of particles formed using two or more kinds of materials may be used. It is preferable to use a material having good heat resistance and surface workability for the wavelength conversion layer 32. As the wavelength conversion layer 32, a fluorescent material layer in which fluorescent material particles are dispersed in an inorganic binder such as alumina, a fluorescent material layer in which fluorescent material particles are sintered without using a binder, or the like is preferably used.

A dichroic film 34A is provided on the light incident surface 32a of the wavelength conversion layer 32.

The dichroic film 34A has a property of transmitting the blue excitation light B output from the excitation light source 110 shown in FIG. 2 and reflecting the yellow fluorescent light Y generated in the wavelength conversion layer 32.

The reflection film 35 is provided on the inner peripheral surface 31e of the hole 31h of the support member 31 and present between the support member 31 and the wavelength conversion layer 32. That is, the reflection film is provided between the inner peripheral surface 31e of the hole 31h and the connecting surfaces 32c of the wavelength conversion layer 32. The reflection film 35 has a reflection surface 35e along the optical axis of the pickup system 60. The peripheral surface 31e of the hole 31h is along the optical axis of the pickup system 60, and thus, the reflection surface 35e of the reflection film 35 deposited on the peripheral surface 31e is also along the optical axis of the pickup system 60.

The end surface (end portion) 35b of the reflection film 35 on the pickup system 60 side extends closer to the pickup system 60 than the light exiting surface 32b of the wavelength conversion layer 32. The end surface 35b of the reflection film 35 crosses the optical axis of the pickup system 60 and coincides with the second surface 31b of the support member 31. In the embodiment, the whole end surface 35b present around the optical axis of the pickup system 60 coincides with the second surface 31b of the support member 31.

The reflection film 35 reflects the light output from the light exiting surface 32b in the wavelength conversion layer 32 (the excitation light B transmitted through the wavelength conversion layer 32 and the fluorescent light Y generated in the wavelength conversion layer 32). It is desirable to use a metal material having higher light reflectance such as aluminum or silver for the reflection film 35.

The light-transmissive member 33 is provided to face the light incident surface 32a of the wavelength conversion layer 32, specifically, the dichroic film 34A provided on the light incident surface 32a, and fixed to the first surface 31a side of the support member 31 via a joining member 36. The light-transmissive member 33 of the embodiment is formed using a plano-convex lens of sapphire having higher thermal conductivity in a hemispherical shape in a sectional view. The light-transmissive member 33 has a flat surface 33f and a convex surface (curved surface) 33d. The flat surface 33f of the light-transmissive member 33 faces the light incident surface 32a of the wavelength conversion layer 32 via the dichroic film 34A. The convex surface 33d of the light-transmissive member 33 is a curved surface projecting in an opposite direction to the traveling direction of the excitation light B from the excitation light source 110.

An anti-reflection film 34C is provided on the flat surface 33f of the light-transmissive member 33.

The anti-reflection film 34C has a property of suppressing the reflection of the excitation light B, and the transmission efficiency of the excitation light B is improved by deposition of the film on the flat surface 33f of the light-transmissive member 33.

The joining member 36 is provided between the light-transmissive member 33 and the support member 31.

Specifically, the joining member 36 is placed between the anti-reflection film 34C provided on the light-transmissive member 33 and the first surface 31a of the support member 31 and joins the light-transmissive member 33 to the support member 31. As the joining member 36, a material having higher thermal conductivity is preferable regardless whether the material has light-transmissivity or not. The material includes e.g. solder and a thermally conductive sheet.

As shown in FIG. 4, of the fluorescent lights Y output from the wavelength conversion layer 32, the light output from the second light exiting surface 32b2 travels toward the pickup system 60 without change, while the light output from the first light exiting surface 32b1 tilted with respect to the optical axis is reflected in the reflection film 35 (reflection surface 35e) and enters the pickup system 60 like the other output lights.

As described above, in the configuration of the embodiment, the light exiting surface 32b in the wavelength conversion layer 32 does not project from the reference plane (plane) N toward the pickup system 60 side. Because of the light tunnel structure, of the output lights from the light exiting surface 32b, the light not along the optical axis of the pickup system 60 (the light having a tilt with respect to the optical axis of the pickup system 60) may be totally reflected and output toward the pickup system 60 side in the reflection film 35 (reflection surface 35e).

Further, in the wavelength conversion element 30 of the embodiment, the area of the light exiting surface 32b in the wavelength conversion layer 32 is increased by providing the first light exiting surface 32b1 and the second light exiting surface 32b2, and thereby, the amount of output lights is increased compared to the case with the same amount of excitation light output from the excitation light source 110. That is, the light emission area in the wavelength conversion layer 32 is increased, and thereby, the amount of output lights output from the wavelength conversion element 30 is increased.

As described above, as means for increasing the amount of output lights output from the wavelength conversion layer 32, increase of the light emission area is considered.

Next, as comparative examples to the wavelength conversion element of the embodiment, several configurations with increased light emission areas will be described. In the respective drawings used for the explanation, the component elements in common with FIGS. 1 to 4 have the same signs.

Comparative Example 1

Figure 14:
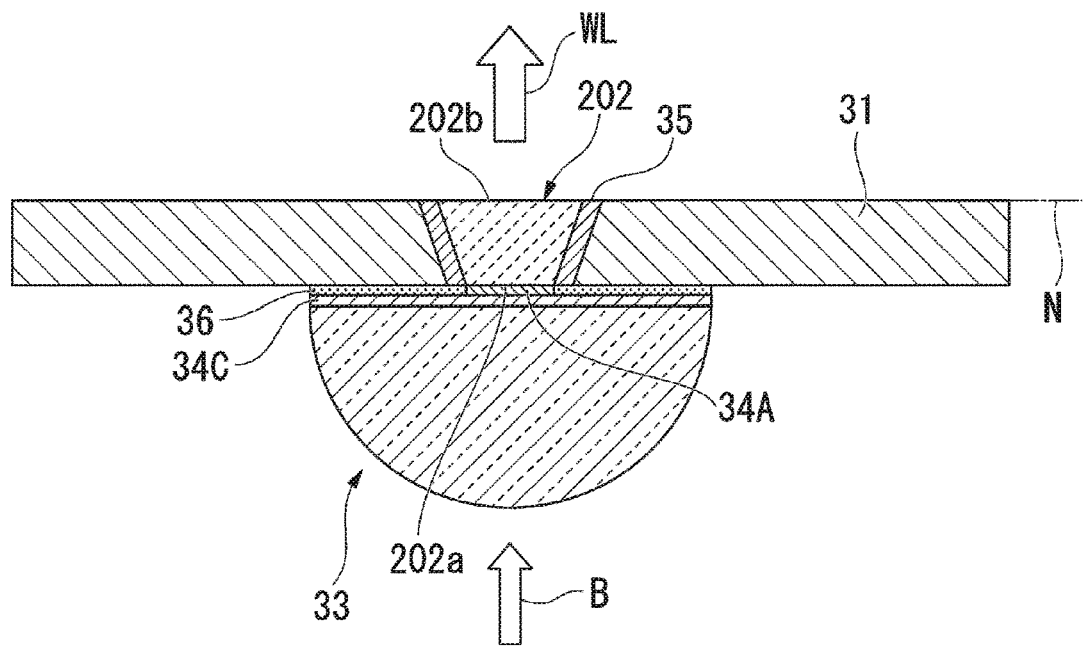
FIG. 14 shows a configuration of a wavelength conversion element 202 of comparative example 1.

FIG. 14 shows a configuration of a wavelength conversion element 202 of comparative example 1.

As shown in FIG. 14, in the case of the configuration in which the light emission area of the wavelength conversion layer 202 (the area of a light exiting surface 202b) is increased with respect to a light incident surface 202a, etendue increases and use efficiency of light may be lower in the downstream pickup system 60.

Comparative Example 2

Figure 15:
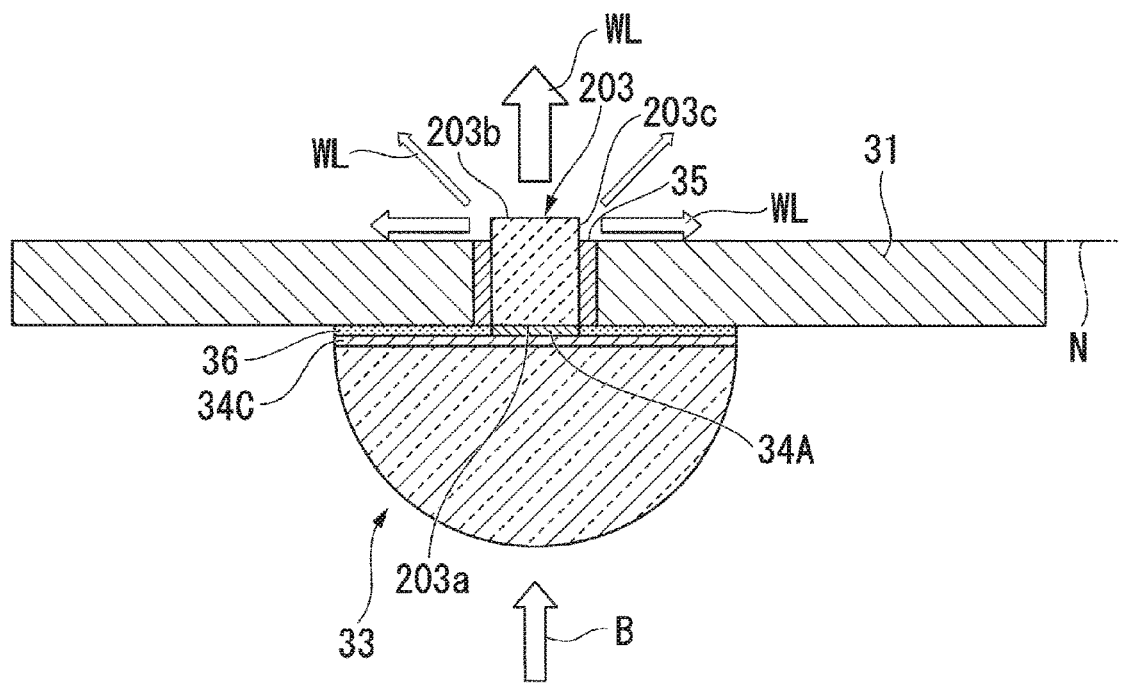
FIG. 15 shows a configuration of a wavelength conversion element 203 of comparative example 2.

FIG. 15 shows a configuration of a wavelength conversion element 203 of comparative example 2.

As shown in FIG. 15, in the case of the configuration in which a light exiting surface 203b of the wavelength conversion element 203 projects from the reference plane N, the lights output from connecting surfaces (side surfaces) 203c connecting a light incident surface 203a and the light exiting surface 203b (the lights in directions crossing the optical axis of the pickup system 60 of the light source device 2A in FIG. 2) are not available in the downstream pickup system 60. Lambert's emission occurs not only in the light exiting surface 203b but also in the connecting surfaces 203c, and thus, the lights not entering the pickup system 60 increase and the use efficiency of light is lower.

Comparative Example 3

Figure 16:
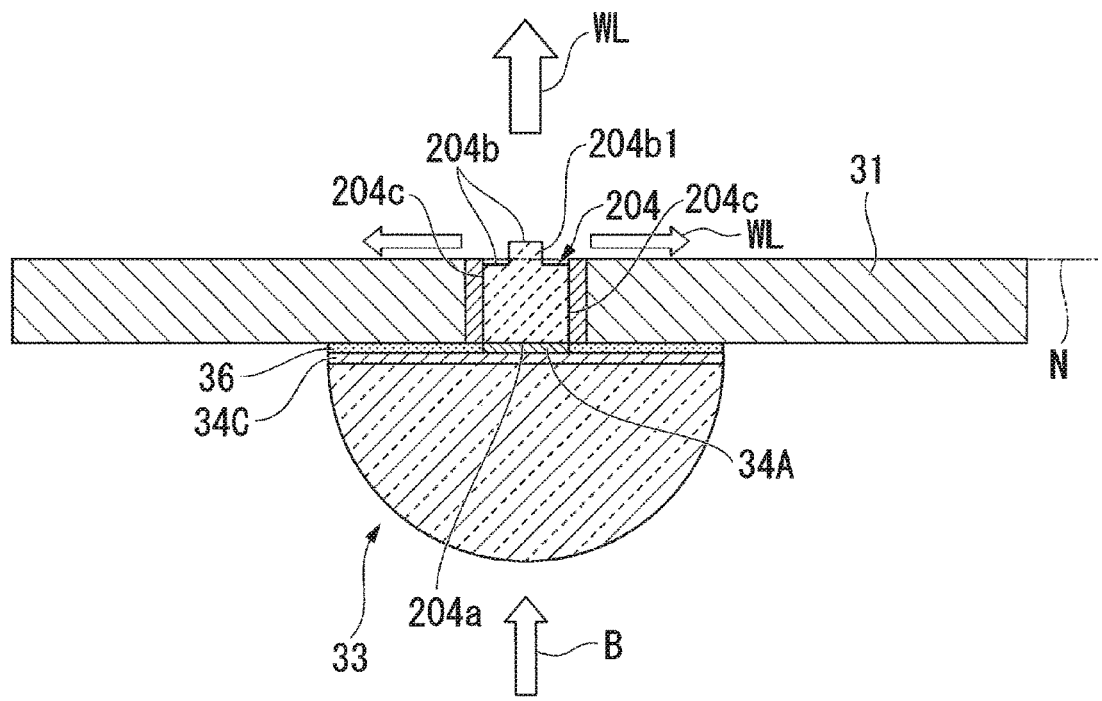
FIG. 16 shows a configuration of a wavelength conversion element 204 of comparative example 3.

FIG. 16 shows a configuration of a wavelength conversion element 204 of comparative example 3.

As shown in FIG. 16, even in the case of the configuration in which connecting surfaces (side surfaces) 204c connecting a light incident surface 204a and the light exiting surface 204b do not project from the reference plane N, when only a part of the light exiting surface 204b of the wavelength conversion element 204 projects from the reference plane N, the light output from a first light exiting surface 204b1 in a direction along the optical axis of the pickup system 60 of the light source device 2A in FIG. 2 of the light exiting surface 204b (the light in a direction crossing the optical axis of the pickup system 60) is not available in the downstream pickup system 60. Therefore, the lights not entering the pickup system 60 increase and the use efficiency of light is lower.

Comparative Example 4

Figure 17:
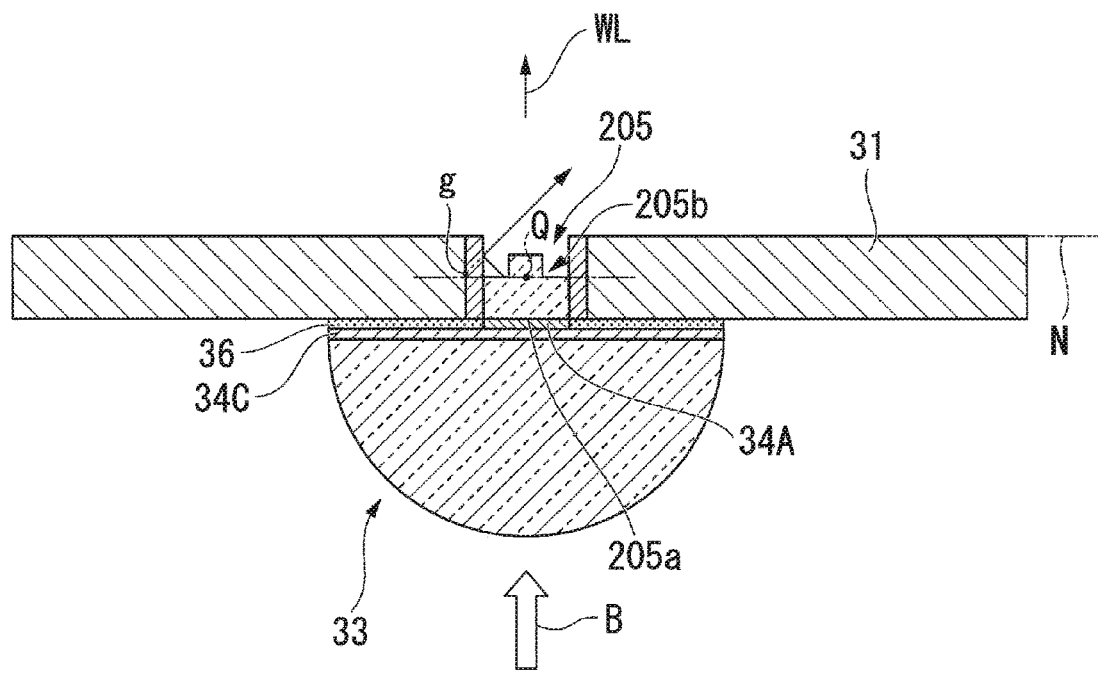
FIG. 17 shows a configuration of a wavelength conversion element 205 of comparative example 4.

FIG. 17 shows a configuration of a wavelength conversion element 205 of comparative example 4.

As shown in FIG. 17, in the case where a focal point Q of the pickup system 60 is located closer to a light incident surface 205a of the wavelength conversion element 205 than the reference plane N, the output light reflected in the reflection film 35 is regarded as a light output from a virtual exit position g in the drawing as seen from the pickup system 60 side. The virtual exit position g is located outside of the wavelength conversion element 205 in the width direction in the direction crossing the optical axis of the pickup system 60. Accordingly, the size of a secondary light source image as seen from the pickup system 60 side is larger.

The brightness of lights that can be collected to a display panel is regulated by a value of a product of a light emission area and a radiation angle of a light source (Etendue). Accordingly, if the value of the product of the light emission area and the radiation angle of the light source is smaller than the value of the product of the incident angle and the incident area of light for the display panel, the output light from the light source is not effectively available.

In the configuration of comparative example 4, the light emission area (the area of the light exiting surface 205b) may be increased, however, etendue increases and the output light from the wavelength conversion layer 205 is not effectively available in the downstream pickup system 60.

On the other hand, in the wavelength conversion element 30 of the embodiment, the wavelength conversion layer 32 is embedded within the hole 31h of the support member 31 and a so-called light tunnel 14 having a hollow part of the hole 31h with the reflection film 35 on the inner peripheral surface 31e is formed. The light exiting surface 32b of the wavelength conversion layer 32 does not project toward the pickup system 60 side from the reference plane N along the end surface 35b of the reflection film 35, and thus, the light traveling not directly toward the pickup system 60 of the lights output from the light exiting surface 32b enters the reflection film 35 and is totally reflected and output toward the pickup system 60.

In the light source device 2A including the wavelength conversion element 30, as shown in FIG. 3, the focal point Q of the pickup system 60 is formed on the optical axis of the pickup system 60 and the reference plane N containing the end surface 35b of the reflection film 35. The focal point Q of the pickup system 60 is formed on the reference plane N, and thereby, the light output from the wavelength conversion layer 32 and reflected in the reflection film 35 may be regarded as being output from the exit of the light tunnel 14 along the reference plane N. In this regard, the exit of the light tunnel 14 along the reference plane N may be used as the light emission surface of the wavelength conversion element 30. Thereby, a secondary light source image having the same light source size as the opening area of the exit is formed at the exit of the light tunnel 14 as seen from the pickup system 60 side. That is, a secondary light source image having the same light source size as the area of the light incident surface 32a is formed at the exit of the light tunnel 14.

In the embodiment, the size of the secondary light source image in the wavelength conversion element 30 is unchanged as is the case where the light exiting surface is not increased (the case where the areas of the light exiting surface and the light incident surface are equal), and the etendue does not increase. Accordingly, even in the configuration in which the light emission area in the wavelength conversion layer 32 (the area of the light exiting surface 32b) is made larger than that of the light incident surface 32a, the amount of output lights in the wavelength conversion element 30 may be increased without change in the amount of excitation light output from the excitation light source 110 and the extraction efficiency of light can be improved without increase in etendue.

As described above, according to the configuration of the embodiment, the amount of light output from the wavelength conversion element 30 can be increased without increase in etendue, and the use efficiency of light in the light source system (e.g. the pickup system 60 in the light source device 2A in FIG. 2) provided at the downstream may be improved. Therefore, the light source device 2A with higher use efficiency of light relative to the input power may be obtained. Further, the light source device 2A is applied to a projector, and thereby, the projector with higher use efficiency of light relative to the input power may be provided.

In the embodiment, the heat dissipation property in the wavelength conversion element 30 is also good.

Specifically, the reflection film 35 is provided along the connecting surfaces 32c of the wavelength conversion layer 32 and the reflection film 35 is in contact with the connecting surfaces 32c. The heat generated in the wavelength conversion layer 32 is transferred to the support member 31 via the reflection film 35 and dissipated in the support member 31. Accordingly, the heat generated in the wavelength conversion layer 32 can be effectively dissipated from the support member 31.

Further, in the embodiment, the light-transmissive member 33 is provided in contact with the light incident surface 32a side of the wavelength conversion layer 32. Accordingly, even in the case where the connecting surfaces 32c in the wavelength conversion layer 32 are small relative to the light incident surface 32a, the heat generated in the wavelength conversion layer 32 may be transferred from the light incident surface 32a side to the light-transmissive member 33 and can be dissipated in the light-transmissive member 33. Thereby, reduction of conversion efficiency in the wavelength conversion layer 32 may be suppressed.

Wavelength Conversion Element of Second Embodiment

Next, a configuration of a wavelength conversion element in the second embodiment will be explained.

Figure 5:
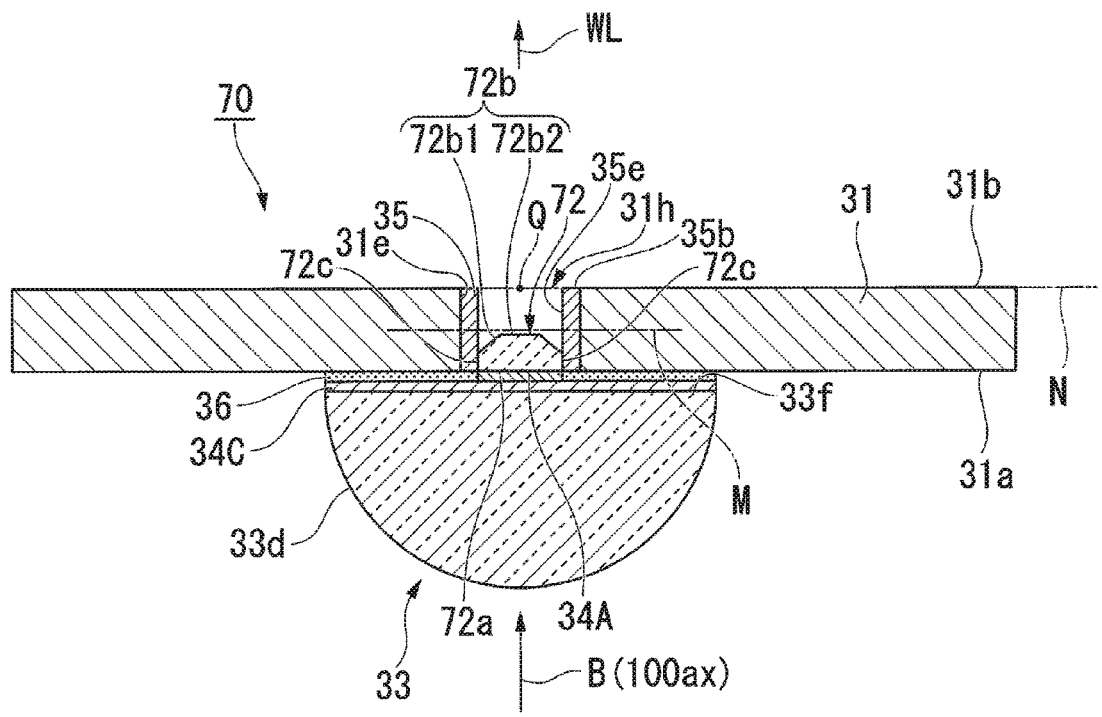
FIG. 5 is a sectional view of a wavelength conversion element 70 in a second embodiment cut along the plane containing the illumination light axis 100ax.
Figure 6:
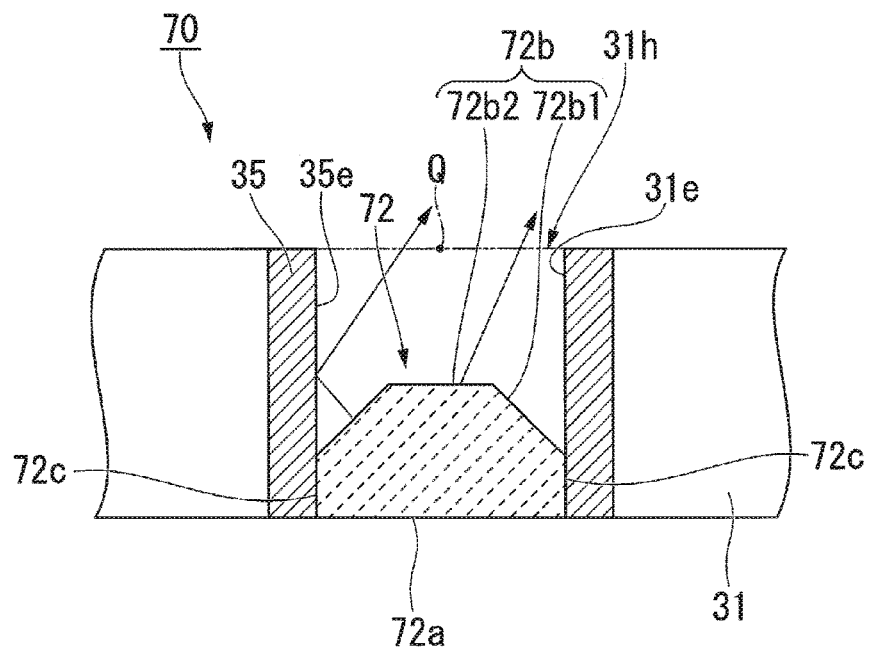
FIG. 6 is a diagram for explanation of optical paths of lights output from the wavelength conversion element 70 in the second embodiment.

FIG. 5 is a sectional view of a wavelength conversion element 70 in the second embodiment cut along the plane containing the illumination light axis 100ax in FIG. 2. FIG. 6 is a diagram for explanation of optical paths of lights output from the wavelength conversion element in the second embodiment.

As shown in FIG. 5, the wavelength conversion element 70 includes a wavelength conversion layer 72 having a thinner thickness in the optical axis direction (the direction along the illumination light axis 100ax in FIG. 2) than the wavelength conversion layer 32 of the first embodiment.

The wavelength conversion layer 72 of the embodiment has the same function of converting the entering excitation light B into the fluorescent light Y as the wavelength conversion layer 32 of the first embodiment.

The wavelength conversion layer 72 has a light incident surface 72a that the excitation light B enters and crosses the optical axis of the excitation light B (or the illumination light axis 100ax), a light exiting surface 72b facing the light incident surface 72a, and connecting surfaces 72c that connect the light incident surface 72a and the light exiting surface 72b. The connecting surfaces 72c are in contact with the reflection film 35 provided on the inner peripheral surface 31e of the hole 31h of the support member 31. The light incident surface 72a is located on the same plane as the first surface 31a of the support member 31.

The light exiting surface 72b of the embodiment has a first light exiting surface 72b1 with a tilt with respect to the light incident surface 72a and a tilt with respect to the optical axis of the pickup system 60 (or the illumination light axis 100ax), and a second light exiting surface 72b2 with a tilt with respect to the first light exiting surface 72b1. Specifically, the second light exiting surface 72b2 faces the light incident surface 72a and crosses the optical axis of the pickup system 60. The first light exiting surface 72b1 is a surface tilted in a direction away from the reflection film 35 toward the pickup system 60 side. The area of the light exiting surface 72b including a convex bending surface is larger than the area of the light incident surface 72a of the wavelength conversion layer 72.

In the embodiment, when the center position in the depth direction of the hole 31h with the wavelength conversion layer 72 provided therein (the center position of the support member 31 in the plate thickness direction) is referred to as "reference position M", the light exiting surface 72b (first light exiting surface 72b1 and the second light exiting surface 72b2) is located closer to the light incident surface 72a than the reference position M.

The dichroic film 34A that transmits the excitation light B and reflects the fluorescent light Y is provided on the light incident surface 72a of the wavelength conversion layer 72.

In the light source device 2A including the wavelength conversion element 70, the focal point Q of the pickup system 60 is formed on the center optical axis of the wavelength conversion element 70 and the reference plane N containing the end surface 35b of the reflection film 35.

Also, in the wavelength conversion element 70 of the embodiment, the wavelength conversion layer 72 is embedded within the hole 31h of the support member 31 in the reference position M (the center position in the depth direction of the hole 31h or the center position of the support member 31 in the plate thickness direction) and a so-called light tunnel structure having a hollow part of the hole 31h with the reflection film 35 on the inner peripheral surface 31e is formed. As described above, the light is reflected by the reflection film 35 exposed within the hole 31h (not in contact with the connecting surfaces 72c of the wavelength conversion layer 72).

As shown in FIGS. 5 and 6, most of the lights output from the first light exiting surface 72b1 of the wavelength conversion layer 72 are reflected in the reflection film 35 and travel toward the pickup system 60. Further, the lights output from the second light exiting surface 72b2 include lights traveling toward the pickup system 60 without change and lights reflected in the reflection film 35 and traveling toward the pickup system 60. In the embodiment, the thickness of the wavelength conversion layer 72 is thinner, and thereby, part of the lights radially output from the second light exiting surface 72b2 enters the reflection film 35 and is reflected therein. As described above, in the embodiment, many of the fluorescent lights Y output from the light exiting surface 72b are reflected in the reflection film 35 and travel toward the pickup system 60.

Also, in the embodiment, the light emission area in the wavelength conversion layer 72 may be increased without increase in etendue and the extraction efficiency of light from the wavelength conversion element 70 may be improved. Further, in the embodiment, the light tunnel is longer, and the number of times of reflection in the reflection film 35 increases and the intensity of the output lights is homogeneous within the hole 31h (light tunnel 14).

Wavelength Conversion Element of Third Embodiment

Next, a configuration of a wavelength conversion element 80 of a third embodiment of the invention will be explained.

Figure 7:
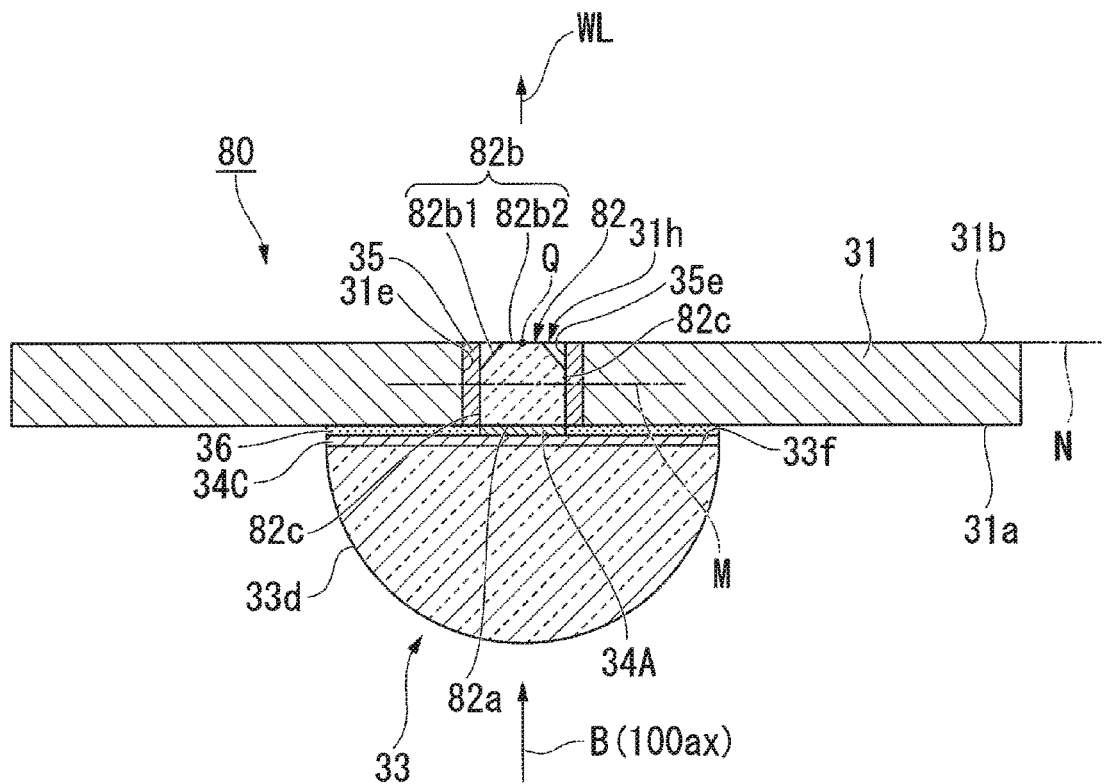
FIG. 7 is a sectional view of a wavelength conversion element 80 in a third embodiment cut along the plane containing the illumination light axis 100ax.

FIG. 7 is a sectional view of the wavelength conversion element 80 in the third embodiment cut along the plane containing the illumination light axis 100ax in FIG. 2.

As shown in FIG. 7, the wavelength conversion element 80 includes a wavelength conversion layer 82 having a thicker thickness in the optical axis direction (the direction along the illumination light axis 100ax in FIG. 2) than the wavelength conversion layer 32 of the first embodiment.

The wavelength conversion layer 82 has a light incident surface 82a that the excitation light B enters and crosses the optical axis of the excitation light B (or the illumination light axis 100ax), a light exiting surface 82b facing the light incident surface 82a, and connecting surfaces 82c that connect the light incident surface 82a and the light exiting surface 82b. The connecting surfaces 82c are in contact with the reflection film 35 provided on the inner peripheral surface 31e of the hole 31h of the support member 31. The light incident surface 82a is located on the same plane as the first surface 31a of the support member 31.

The light exiting surface 82b of the embodiment has a first light exiting surface 82b1 with a tilt with respect to the light incident surface 82a and a tilt with respect to the optical axis of the pickup system 60 (or the illumination light axis 100ax), and a second light exiting surface 82b2 with a tilt with respect to the first light exiting surface 82b1. Specifically, the second light exiting surface 82b2 faces the light incident surface 82a and crosses the optical axis of the pickup system 60. The first light exiting surface 82b1 is a surface tilted in a direction away from the reflection film 35 toward the pickup system 60 side. The area of the light exiting surface 82b including a convex bending surface is larger than the area of the light incident surface 82a of the wavelength conversion layer 82.

In the embodiment, when the center position in the depth direction of the hole 31h with the wavelength conversion layer 82 provided therein (the center position of the support member 31 in the plate thickness direction) is referred to as "reference position M", the light exiting surface 82b (first light exiting surface 82b1 and the second light exiting surface 82b2) of the wavelength conversion layer 82 is entirely located closer to the end surface 35b of the reflection film 35 than the reference position M, and, in the optical axis direction, the position of the second light exiting surface 82b2 of the wavelength conversion layer 82 coincides with the end surface 35b of the reflection film 35. The second light exiting surface 82b2 also coincides with the reference plane N containing the end surface 35b of the reflection film 35, and the focal point Q of the pickup system 60 is formed on the second light exiting surface 82b2.

Further, in the embodiment, the first light exiting surface 82b1 is tilted with respect to the second light exiting surface 82b2, and a light tunnel structure having a hollow part within the hole 31h by a space formed between the first light exiting surface 82b1 and the reflection film 35 is formed. Accordingly, of the lights output from the first light exiting surface 82b1 of the wavelength conversion layer 82, the lights having particularly larger radiation angles (divergence angles) with respect to the optical axis of the pickup system 60 may be reflected in the reflection film 35 and entered into the pickup system 60.

As described above, also, in the embodiment, the light emission area in the wavelength conversion layer 82 may be increased without increase in etendue and the extraction efficiency of light from the wavelength conversion element 80 may be improved.

Modified Example

Next, a modified example of the wavelength conversion layers (wavelength conversion layers having different thicknesses) in the first embodiment to the third embodiment will be explained.

Figure 8:
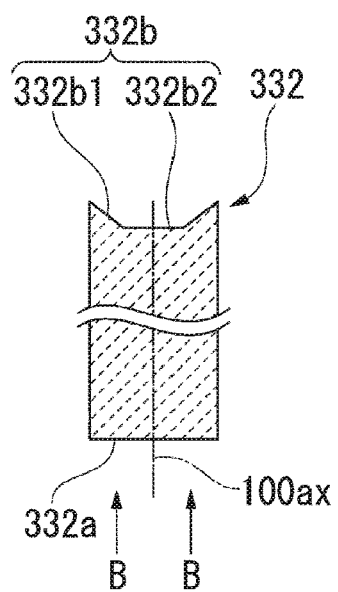
FIG. 8 is a sectional view showing a modified example of the wavelength conversion layers in the first embodiment to the third embodiment.

FIG. 8 is a sectional view showing the modified example of the wavelength conversion layers in the first embodiment to the third embodiment.

In the above described first embodiment to third embodiment, a light exiting surface 332b of a wavelength conversion layer 332 has a convex shape projecting toward the pickup system 60 side, however, not limited to the shape. For example, as shown in FIG. 8, the light exiting surface 332b may have a concave shape concave toward a light incident surface 332a.

The wavelength conversion layer 332 has a light incident surface 332a that the excitation light B enters and crosses the optical axis of the excitation light B (or the illumination light axis 100ax in FIG. 2), and a light exiting surface 332b facing the light incident surface 332a. Note that the light incident surface 332a may be located on the same plane as the first surface 31a of the support member 31 (not shown).

The light exiting surface 332b in FIG. 8 has a first light exiting surface 332b1 with a tilt with respect to the light incident surface 332a and a tilt with respect to the optical axis of the pickup system 60 in FIG. 2 (or the illumination light axis 100ax), and a second light exiting surface 332b2 with a tilt with respect to the first light exiting surface 332b1. Specifically, the second light exiting surface 332b2 faces the light incident surface 332a and crosses the optical axis of the pickup system 60 in FIG. 2. The first light exiting surface 332b1 is a surface tilted in a direction away from the reflection film 35 (not shown) toward the pickup system 60 side in FIG. 2. The area of the light exiting surface 332b including a concave bending surface is larger than the area of the light incident surface 332a of the wavelength conversion layer 332.

When the focal point Q of the pickup system 60 in FIG. 2 is formed on the optical axis of the pickup system 60 (or the illumination light axis 100ax in FIG. 2) and the reference plane containing the end surface 35b of the reflection film 35 (not shown), the end portion of the first light exiting surface 332b1 opposite to the second light exiting surface 332b2 may coincide with the reference plane or formed closer to the light incident surface 332a than the reference plane.

The focal point Q of the pickup system 60 in FIG. 2 is formed on the reference plane containing the end surface 35b of the reflection film 35 (not shown), and thus, the area of the light exiting surface 332b in the wavelength conversion layer 332, i.e., the light emission area may be increased without increase in etendue, and the extraction efficiency of light from the wavelength conversion layer 332 may be improved.

Wavelength Conversion Element of Fourth Embodiment

Next, a configuration of a wavelength conversion element 90 of a fourth embodiment of the invention will be explained.

In the above described embodiments, of the first light exiting surface and the second light exiting surface forming the light exiting surface, at least the second light exiting surface crosses the optical axis of the pickup system 60, however, in the embodiment, neither the first light exiting surface nor the second light exiting surface crosses the optical axis, but both tilt with respect to the optical axis.

Figure 9:
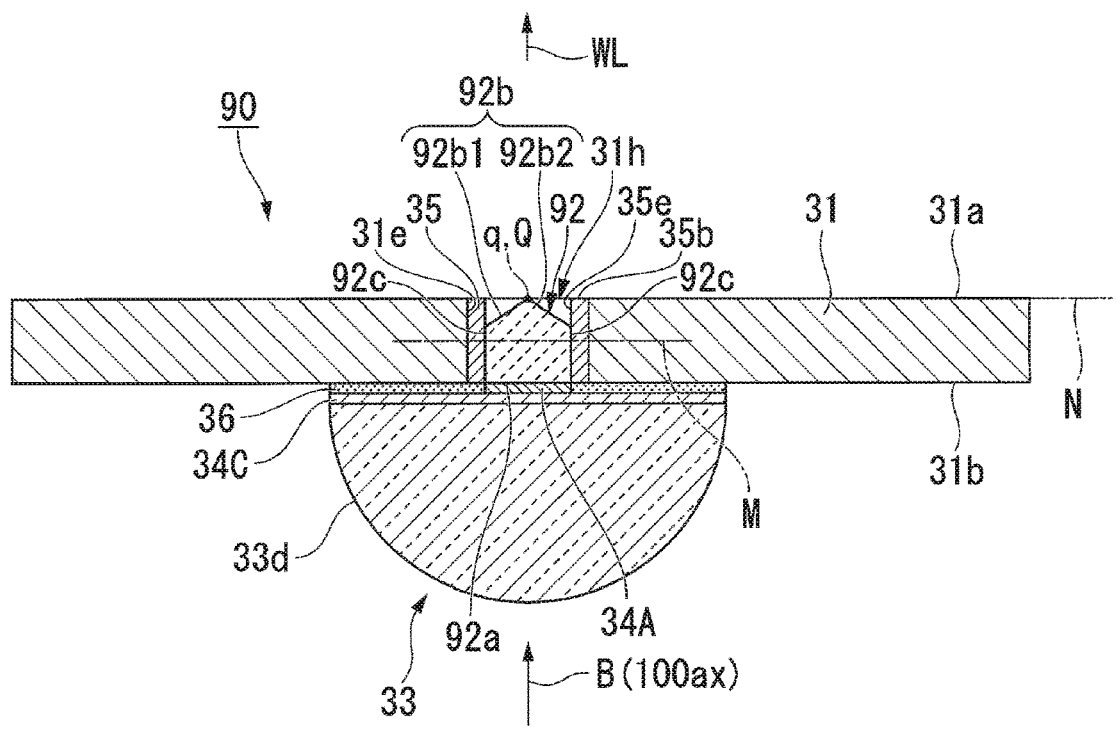
FIG. 9 is a sectional view of a wavelength conversion element 90 in a fourth embodiment cut along the plane containing the illumination light axis 100ax.

FIG. 9 is a sectional view of the wavelength conversion element 90 in the fourth embodiment cut along the plane containing the illumination light axis 100ax in FIG. 2.

As shown in FIG. 9, the wavelength conversion element 90 includes a wavelength conversion layer 92 having a light incident surface 92a, a light exiting surface 92b including a first light exiting surface 92b1 and a second light exiting surface 92b2 tilted at predetermined angles with respect to the optical axis of the pickup system 60 in FIG. 2, and connecting surfaces 92c that connect these light incident surface 92a and light exiting surface 92b. The first light exiting surface 92b1 and the second light exiting surface 92b2 tilt in directions crossing the optical axis in the opposite directions to each other and a top portion q coincides with the reference plane N containing the end surface 35b of the reflection film 35. In the embodiment, the focal point Q of the pickup system 60 is formed in the top portion q of the wavelength conversion layer 92.

The focal point Q of the pickup system 60 is formed on the reference plane N containing the end surface 35b of the reflection film 35, and thus, the area of the light exiting surface 92b in the wavelength conversion layer 92, i.e., the light emission area may be increased without increase in etendue, and the extraction efficiency of light from the wavelength conversion layer 92 may be improved.

Modified Example 1

Next, a configuration of a wavelength conversion layer 93 of modified example 1 in the fourth embodiment will be explained.

Figure 10:
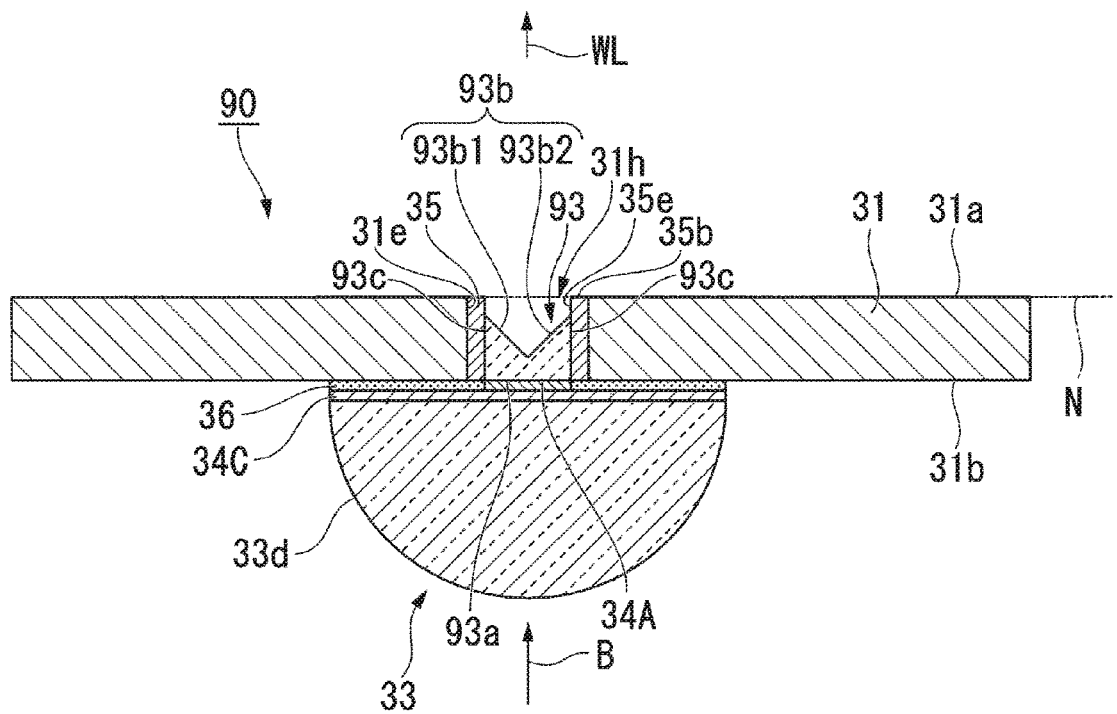
FIG. 10 is a sectional view showing modified example 1 of the wavelength conversion layer in the fourth embodiment.

FIG. 10 is a sectional view showing the configuration of the wavelength conversion layer 93 of modified example 1 in the fourth embodiment.

As shown in FIG. 9, the wavelength conversion layer 92 of the above described embodiment has the convex shape in which the top portion q of the light exiting surface 92b projects toward the pickup system 60 side, however, not limited to that. As shown in FIG. 10, the wavelength conversion layer 93 having a concave shape in which a light exiting surface 93b including a first light exiting surface 93b1 and a second light exiting surface 93b2 is concave toward the light incident surface side may be used.

In the example, the wavelength conversion layer 93 is placed within the hole 31h so that the light exiting surface 93b (the first light exiting surface 93b1 and the second light exiting surface 93b2) may not coincide with the reference plane N containing the end surface 35b of the reflection film 35. Accordingly, of the lights output from the light exiting surface 93b, the lights traveling in directions crossing the optical axis of the pickup system 60 may be reduced and the lights not available in the downstream pickup system 60 may be reduced. Therefore, the increase of the lights not entering the pickup system 60 and the reduction of use efficiency of light may be suppressed.

Modified Example 2

Next, a configuration of a wavelength conversion layer 94 of modified example 2 in the fourth embodiment will be explained.

Figure 11A:
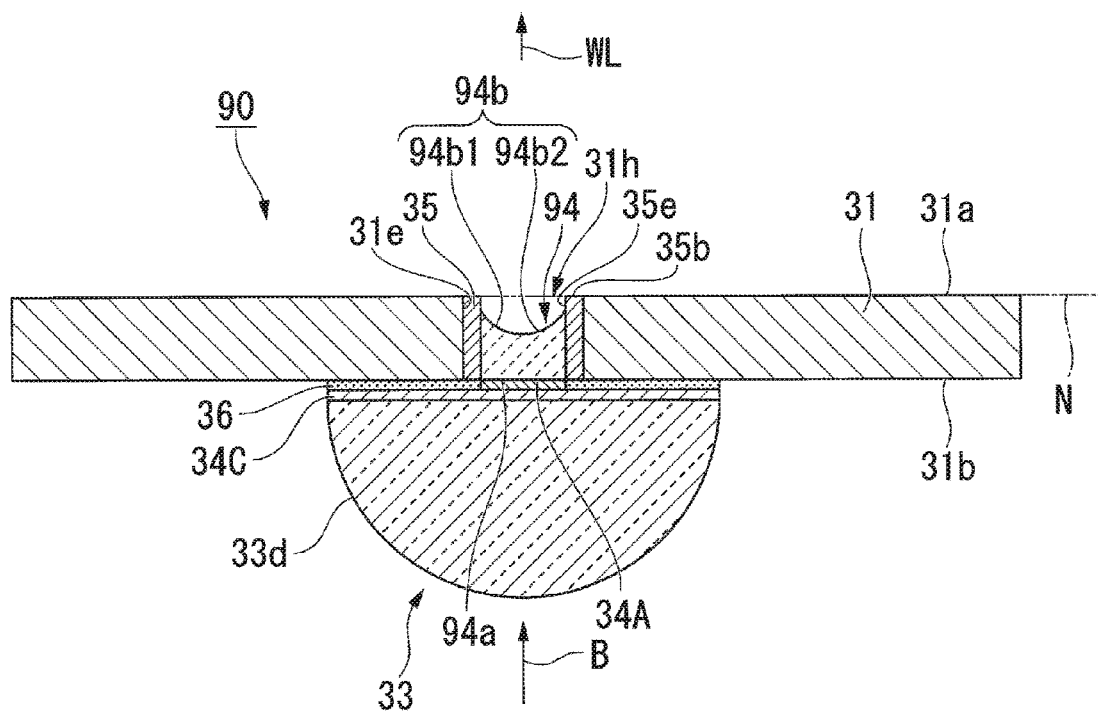
FIG. 11A is a sectional view showing modified example 2 of the wavelength conversion layer in the fourth embodiment.

FIG. 11A is a sectional view showing a wavelength conversion element including the wavelength conversion layer 94 of modified example 2 in the fourth embodiment.

As shown in FIG. 9, in the wavelength conversion layer 92 of the above described embodiment, both the first light exiting surface 92b1 and the second light exiting surface 92b2 forming the light exiting surface 92b form flat surfaces, however, not limited to that. As shown in FIG. 11A, the wavelength conversion layer 94 having a light exiting surface 94b in which a first light exiting surface 94b1 and a second light exiting surface 94b2 form a concave curved surface may be used. Here, the wavelength conversion layer 94 is placed within the hole 31h so that the light exiting surface 94b (the first light exiting surface 94b1 and the second light exiting surface 94b2) may not coincide with the reference plane N containing the end surface 35b of the reflection film 35. Accordingly, of the lights output from the light exiting surface 94b, the lights traveling in directions crossing the optical axis of the pickup system 60 may be reduced and the lights not available in the downstream pickup system 60 may be reduced. Therefore, the increase of the lights not entering the pickup system 60 and the reduction of use efficiency of light may be suppressed.

In the example, as shown in FIG. 11A, the light exiting surface 94b forming the curved surface has the shape concave toward a light incident surface 94a side. The light exiting surface 94b is the curved surface concave toward the light incident surface 94a side, and thereby, the light output from the light exiting surface 94b is reflected in the reflection film 35 toward the pickup system 60 and enters the pickup system 60.

Modified Example 3

Next, a configuration of a wavelength conversion layer 95 of modified example 3 in the fourth embodiment will be explained.

Figure 11B:
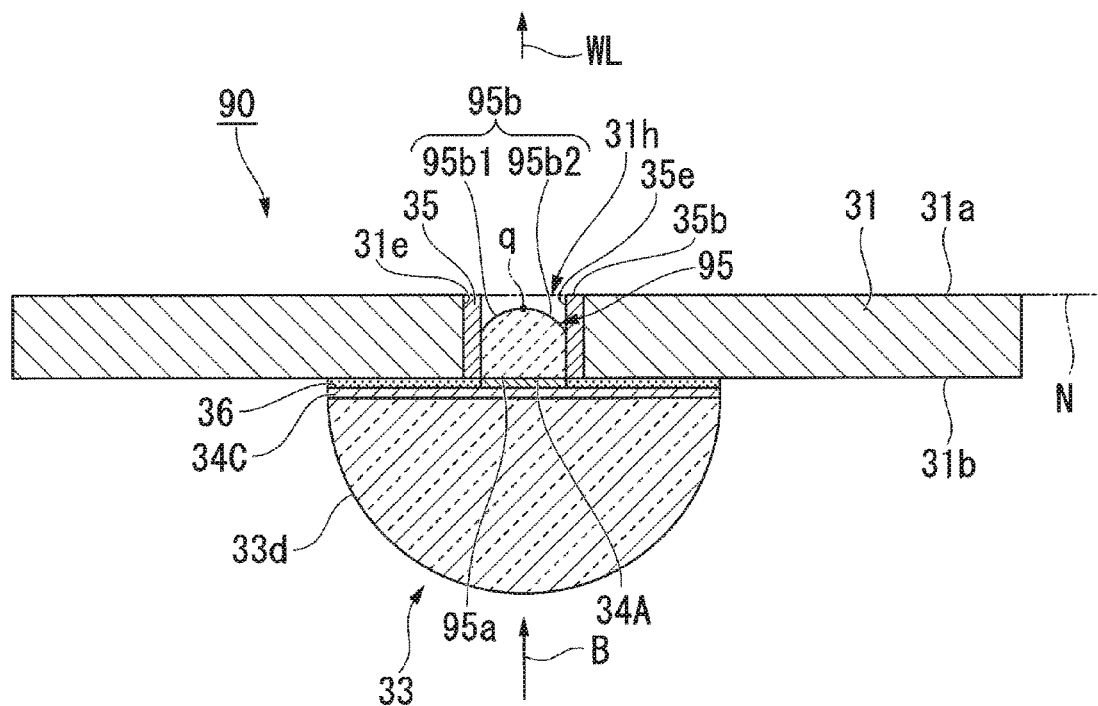
FIG. 11B is a sectional view showing modified example 3 of the wavelength conversion layer in the fourth embodiment.

FIG. 11B is a sectional view showing a wavelength conversion element including the wavelength conversion layer 95 of modified example 3 in the fourth embodiment.

As shown in FIG. 11B, the wavelength conversion layer 95 having a light exiting surface 95b in which a first light exiting surface 95b1 and a second light exiting surface 95b2 form a convex curved surface may be used.

In the example, as shown in FIG. 11B, the light exiting surface 95b forming the curved surface has the shape concave toward a light incident surface 95a side. In this case, the dimensions of the wavelength conversion layer 95 (the position of the light exiting surface 95b in the optical axis direction) is set so that peripheral lights of the output lights output from the light exiting surface 95b may be reflected toward the pickup system 60. Here, the wavelength conversion layer 95 is placed within the hole 31h so that a top portion q of the light exiting surface 95b (the boundary portion between the first light exiting surface 95b1 and the second light exiting surface 95b2) may not coincide with the reference plane N containing the end surface 35b of the reflection film 35. Accordingly, of the lights output from the light exiting surface 95b, the lights traveling in directions crossing the optical axis of the pickup system 60 may be reduced and the lights not available in the downstream pickup system 60 may be reduced. Therefore, the increase of the lights not entering the pickup system 60 and the reduction of use efficiency of lights may be suppressed.

Wavelength Conversion Element of Fifth Embodiment

Next, a configuration of a wavelength conversion element 101 of a fifth embodiment of the invention will be explained.

A wavelength conversion layer 102 of the embodiment is different from the configurations of the above described embodiments in that alight exiting surface 102b having a first light exiting surface 102b1, a second light exiting surface 102b2, and a third light exiting surface 102b3 is provided.

Figure 12:
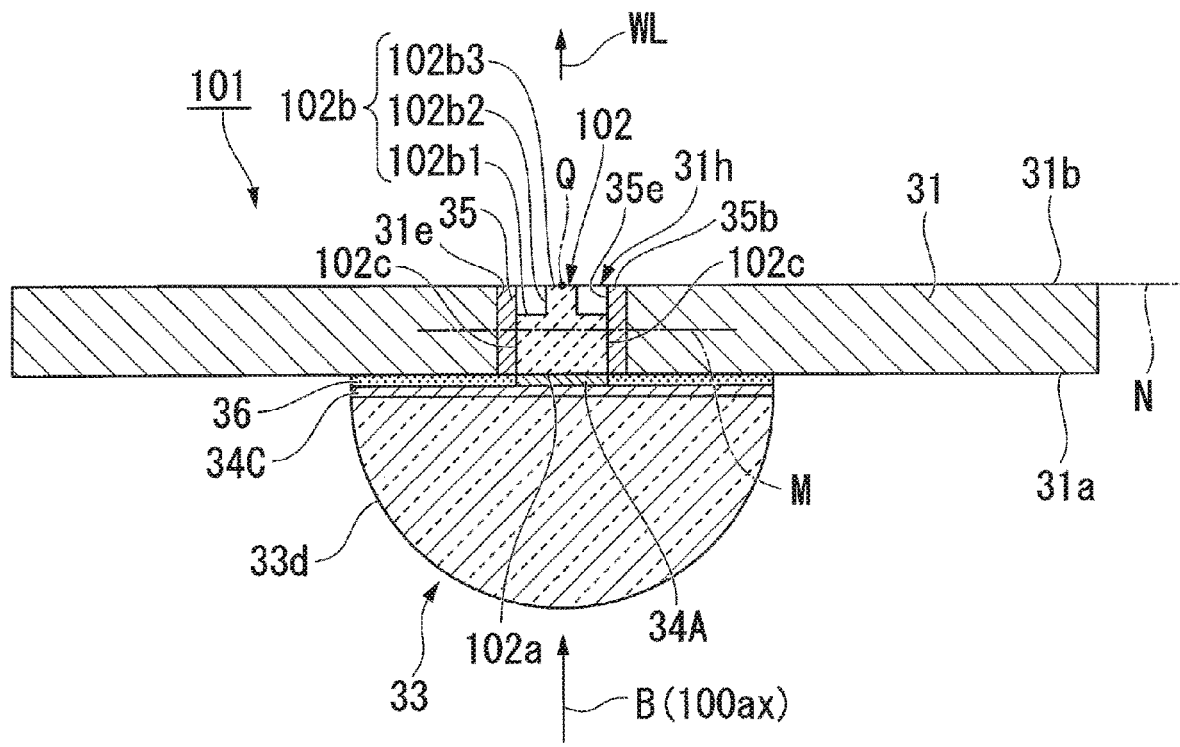
FIG. 12 is a sectional view of a wavelength conversion element 101 in a fifth embodiment cut along the plane containing the illumination light axis 100ax.

FIG. 12 is a sectional view of the wavelength conversion element 101 in the fifth embodiment cut along the plane containing the illumination light axis 100ax in FIG. 2.

As shown in FIG. 12, the wavelength conversion layer 102 of the wavelength conversion element 101 has a light incident surface 102a, and the light exiting surface 102b as a convex surface including the first light exiting surface 102b1 along the direction crossing the optical axis of the pickup system 60 in FIG. 2, the second light exiting surface 102b2 along the same optical axis, the third light exiting surface 102b3 that crosses the optical axis and coincides with the reference plane N containing the end surface 35b of the reflection film 35, and connecting surfaces 102c that connect the light incident surface 102a and the light exiting surface 102b. The light incident surface 102a is a flat surface along the direction crossing the optical axis like those in the other embodiments. The connecting surfaces 102c are in contact with the reflection film 35 provided on the inner peripheral surface 31e of the hole 31h of the support member 31.

In the light source device 2A including the wavelength conversion element 101, the third light exiting surface 102b3 is on the optical axis of the pickup system 60 and coincides with the reference plane N containing the end surface 35b of the reflection film 35, and thus, the focal point Q of the pickup system 60 is formed on the third light exiting surface 102b3.

In the wavelength conversion element 101 of the embodiment, using a light tunnel structure having a hollow part within the hole 31h by a space formed between the second light exiting surface 102b2 and the reflection film 35, of the lights output from the first light exiting surface 102b1 and the second light exiting surface 102b2 of the wavelength conversion layer 102, the lights entering the reflection film 35 may be reflected in the reflection film 35 and entered into the pickup system 60.

Also, in the embodiment, the light emission area in the wavelength conversion layer 102 may be increased without increase in etendue and the extraction efficiency of light from the wavelength conversion element 101 may be improved.

Note that, in the embodiment, the second light exiting surface 102b2 connecting the first light exiting surface 102b1 and the third light exiting surface 102b3 is perpendicular to the first light exiting surface 102b1, however, not limited to that. The second light exiting surface 102b2 facing the reflection film 35 may be tilted with respect to the optical axis so that the angle formed by the first light exiting surface 102b1 and the second light exiting surface 102b2 may be 90° or less. Thereby, the light output from the second light exiting surface 102b2 is reflected in the reflection film 35, re-entered into the wavelength conversion layer 102 and scattered inside, and output toward e.g. the pickup system 60.

The focal point Q of the pickup system 60 is not necessarily required to be formed on the third light exiting surface 102b3. In the case where the focal point Q of the pickup system 60 is formed on the reference plane N containing the end surface 35b of the reflection film 35, the position of the third light exiting surface 102b3 may be freely determined unless the third light exiting surface 102b3 is located closer to the pickup system 60 than the end surface 35b of the reflection film 35. Similarly, the position of the third light exiting surface 102b3 may be freely determined unless the third light exiting surface is located closer to the pickup system 60 than the second surface 31b of the support member 31.

In the case where the focal point Q of the pickup system 60 is formed on the reference plane N containing the end surface 35b of the reflection film 35, when the third light exiting surface 102b3 is located closer to the pickup system 60 than the end surface 35b of the reflection film 35, as shown in FIG. 16, the light output from the first light exiting surface 204b1 (the first light exiting surface 204b1 in FIG. 16 corresponds to the second light exiting surface 102b2 of the embodiment) in the direction along the optical axis of the pickup system 60 (the light traveling in the direction crossing the optical axis of the pickup system 60) is not available in the downstream pickup system 60. Therefore, the lights not entering the pickup system 60 increase and the use efficiency of light is lower.

Thus, in the case where the focal point Q of the pickup system 60 is formed on the reference plane N containing the end surface 35b of the reflection film 35 as shown in FIG. 12, it is preferable that the third light exiting surface 102b3 is not located closer to the pickup system 60 than the end surface 35b of the reflection film 35.

On the other hand, in the case where the third light exiting surface 102b3 is located closer to the first surface 31a of the support member 31 than the end surface 35b of the reflection film 35 (or the reference plane N), it is preferable that the focal point Q of the pickup system 60 is formed between the third light exiting surface 102b3 and the end surface 35b (or the reference plane N) on the inner side of the hole 31h than the reference plane 35e in the depth direction of the hole 31h (the plate thickness direction of the support member 31). Note that it is most preferable that the focal point Q of the pickup system 60 is formed on the reference plane N containing the end surface 35b of the reflection film 35.

In the case where the third light exiting surface 102b3 is located closer to the first surface 31a of the support member 31 than the end surface 35b of the reflection film 35 (or the reference plane N), as shown in FIG. 17, when the focal point Q of the pickup system 60 is located closer to the first surface 31a of the support member 31 than the third light exiting surface 102b3, the output light reflected in the reflection film 35 is regarded as a light output from a virtual exit position g in FIG. 17 as seen from the pickup system 60 side. The virtual exit position g is located outside of the wavelength conversion element 205 in the width direction in the direction crossing the optical axis of the pickup system 60. Accordingly, the size of the secondary light source image as seen from the pickup system 60 is larger. That is, the etendue increases and the output lights from the light source are not effectively available.

However, in the case where the third light exiting surface 102b3 shown in FIG. 12 is located closer to the first surface 31a of the support member 31 than the end surface 35b of the reflection film 35 (or the reference plane N), the focal point Q of the pickup system 60 is formed between the third light exiting surface 102b3 and the end surface 35b (or the reference plane N) on the inner side of the hole 31h than the reference plane 35e in the depth direction of the hole 31h (the plate thickness direction of the support member 31), and thereby, the output lights from the light source are effectively available without increase in etendue. That is, reduction of the use efficiency of light may be suppressed. Note that, in the case where the third light exiting surface 102b3 is located closer to the first surface 31a of the support member 31 than the end surface 35b of the reflection film 35 (or the reference plane N), it is most preferable that the focal point Q of the pickup system 60 is formed on the reference plane N containing the end surface 35b of the reflection film 35.

Projector of Sixth Embodiment

Next, a configuration of a projector of the sixth embodiment will be explained.

A projector 1B of the sixth embodiment (see FIG. 6) as below is different from the configuration of the first embodiment in that the projector includes a blue-separation light source device 2B. In the following description, the configuration of the light source device 2B will be explained in detail and the explanation of the common parts will be omitted. Further, in the respective drawings used in the explanation, the component elements in common with FIGS. 1 to 12 have the same signs.

Figure 13:
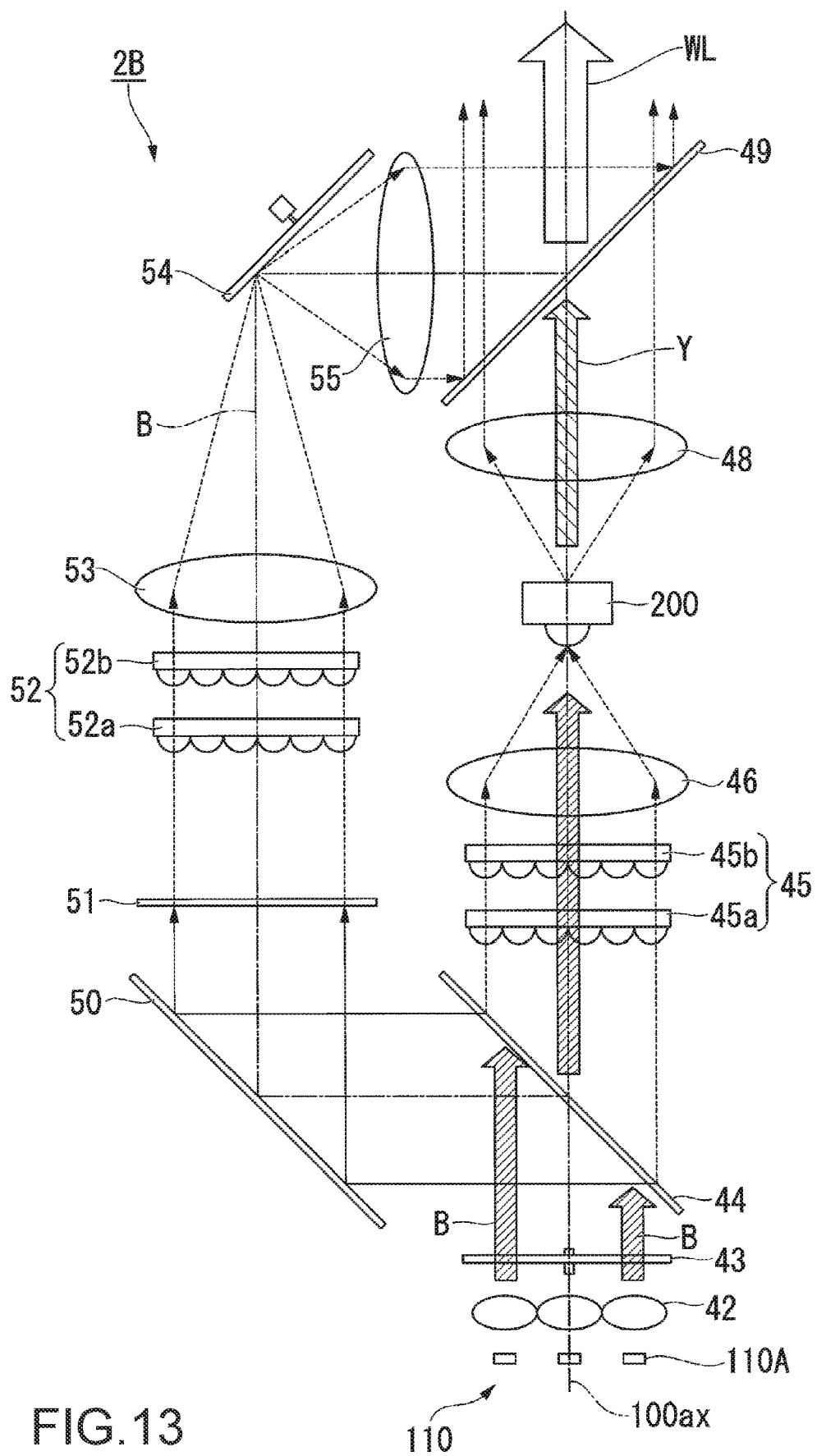
FIG. 13 shows a schematic configuration of a light source device 2B in the sixth embodiment.

FIG. 13 shows a schematic configuration of the light source device 2B in the sixth embodiment.

As shown in FIG. 13, the light source device 2B schematically includes the excitation light source 110, a collimating system 42, a wave plate 43, a polarization separation element 44, a first homogenizer system 45, a first collecting system 46, a wavelength conversion element 200 (one of the wavelength conversion elements 30, 332, 70, 80, 90, 101 of the above described respective embodiments), a first pickup lens 48, a dichroic mirror 49, a total reflection mirror 50, a second wave plate 51, a second homogenizer system 52, a second collecting system 53, a reflection rotatory diffusion element 54, and a second pickup lens 55.

Of the light source device 2B, the excitation light source 110, the collimating system 42, the wave plate 43, the polarization separation element 44, the first homogenizer system 45, the first collecting system 46, the wavelength conversion element 200, the first pickup lens 48, and the dichroic mirror 49 are sequentially arranged on the illumination light axis 100ax.

The wave plate 43 includes a half wave plate having a rotation mechanism. The wave plate 43 converts P-polarized lights and S-polarized lights of the excitation lights B collected by the collimating system 42 at arbitrary ratios. Note that the wave plate 43 may be a quarter wave plate, and is not particularly limited as long as the plate may change the polarization states (the ratios of P-polarized lights and S-polarized lights) by rotation and movement.

The polarization separation element 44 is the so-called plate-type polarizing beam splitter (PBS) and has an inclined surface at an angle of 45° with respect to the illumination light axis 100ax. The polarization separation element 44 passes the P-polarized light component of the incident light and reflects the S-polarized light component. The P-polarized light component is transmitted through the polarization separation element 44 and travels toward the first homogenizer system 45. The S-polarized light component is reflected by the polarization separation element 44 and travels toward the total reflection mirror 50.

The first homogenizer system 45 includes e.g. a first multi-lens array 45a and a second multi-lens array 45b. The first homogenizer system 45 sets the light intensity distribution of the excitation light B to a homogeneous state on the wavelength conversion layer, which will be described later, the so-called top-hat distribution. The first homogenizer system 45 superimposes a plurality of small luminous fluxes output from the plurality of lenses of the first multi-lens array 45a and the second multi-lens array 45b on each other on the wavelength conversion layer with the first collecting system 46. Thereby, the light intensity distribution of the excitation light B radiated onto the wavelength conversion layer is homogenized.

The first collecting system 46 is provided in an optical path from the first homogenizer system 45 to the wavelength conversion element 200, collects and enters the excitation light B into the wavelength conversion layer of the wavelength conversion element 200. The thickness of the wavelength conversion layer is set to a thickness that may convert all of the incident excitation lights B into yellow lights Y. In the embodiment, the first collecting system 46 is formed using a convex lens.

The first pickup lens 48 includes e.g. a convex lens and nearly parallelizes the yellow light Y output from the wavelength conversion element 200.

The dichroic mirror 49 passes the yellow light Y output from the wavelength conversion element 200 and reflects the blue light B entering from a direction orthogonal to the yellow light Y in the same optical axis direction as that of the yellow light Y.

The total reflection mirror 50 is placed in an optical path of the blue light B and totally reflects the S-polarized blue light separated in the polarization separation element 44 toward the second wave plate 51.

The second wave plate 51 is a quarter wave plate (λ/4 plate). The second wave plate 51 converts the S-polarized blue light output from the polarization separation element 44 into circularly-polarized light.

The second homogenizer system 52 includes e.g. a first multi-lens array 52a and a second multi-lens array 52b. The second homogenizer system 52 superimposes a plurality of small luminous fluxes output from a plurality of lenses of the first multi-lens array 52a and the second multi-lens array 52b on each other on the reflection rotatory diffusion element 54 with the second collecting system 53. Thereby, the light intensity distribution of the blue light B radiated onto the reflection rotatory diffusion element 54 is homogenized.

The second collecting system 53 is provided in an optical path from second homogenizer system 52 to the reflection rotatory diffusion element 54, collects and enters the blue light B that has been converted into the circularly-polarized light into the reflection rotatory diffusion element 54. In the embodiment, the second collecting system 53 is formed using a convex lens.

The reflection rotatory diffusion element 54 diffuse-reflects the beam output from the second collecting system 53 toward the second pickup lens 55. As the reflection rotatory diffusion element 54, it is preferable to use an element that diffuse-reflects the beam entering the reflection rotatory diffusion element 54 with characteristics of Lambert's reflection or closer to Lambert's reflection.

The second pickup lens 55 includes e.g. a convex lens and nearly parallelizes the blue light B output from the reflection rotatory diffusion element 54. The parallelized blue light B travels to the dichroic mirror 49 and is reflected in the dichroic mirror 49 in the same direction as that of the yellow light Y traveling in the direction orthogonal to the blue light B.

As described above, the beam (blue light B) output from the reflection rotatory diffusion element 54 is combined with the fluorescent light (yellow light Y) transmitted through the dichroic mirror 49, and white illumination light WL is obtained. The white illumination light WL enters the color separation system 3 shown in FIG. 1.

Note that, in the embodiment, the wavelength conversion element 200 outputs the yellow fluorescent light Y, and, in the case where the wavelength conversion elements in the above described respective embodiments are applied, it is desirable to provide a dichroic film that reflects blue light and transmits yellow light on the light exiting surface of the wavelength conversion layer.

As above, the embodiments according to the invention are explained with reference to the accompanying drawings, however, obviously, the invention is not limited to the examples. It is obvious that a person skilled in the art could conceive various modifications and alterations within the technical ideas described in the appended claims and those are naturally understood to belong the technical scope of the invention.

Note that, in the above describe respective embodiments, the configuration of the wavelength conversion element including the light-transmissive member 33 is described, however, a configuration without the light-transmissive member 33 can be employed as long as the heat generated in the wavelength conversion layer 32 may be sufficiently dissipated in the support member 31.

For example, in the other embodiments except the above described second embodiment, the thickness of the wavelength conversion layer 32 in the direction along the optical axis of the pickup system 60 (the light source device 2A of the first embodiment) or the first pickup lens 48 (the light source device 2B of the sixth embodiment) is thicker and the area of the wavelength conversion layer in contact with the reflection film 35 is larger. Accordingly, the heat may be dissipated from the connecting surface side in contact with the reflection surface 35e. In the case where the connecting surface in the wavelength conversion layer is relatively large with respect to the light incident surface, the heat generated in the wavelength conversion layer is transferred to the support member 31 via the reflection film 35 in contact with the connecting surface and dissipated in the support member 31. As described above, the light-transmissive member 33 is not necessarily required in the configuration in which the heat dissipation property in the support member 31 is higher.

The entire disclosure of Japanese Patent Application No. 2017-025078, filed on Feb. 14, 2017 is expressly incorporated by reference herein.

What is claimed is:

1. A light source device comprising:
an excitation light source that outputs an excitation light;
a wavelength conversion layer having a light incident surface into which the excitation light enters and a light exiting surface that at least outputs a fluorescent light formed by wavelength conversion of the excitation light;
a reflection member that reflects the light output from the light exiting surface; and
a pickup system that parallelizes the fluorescent light output from the wavelength conversion layer, wherein:
the light exiting surface at least has a first light exiting surface with a tilt with respect to an optical axis of the pickup system and a second light exiting surface with a tilt with respect to the first light exiting surface,
the reflection member has a reflection surface along the optical axis of the pickup system and an end portion of the reflection member on the pickup system side extends closer to the pickup system than the first light exiting surface and the second light exiting surface,
a focal point of the pickup system is formed on a plane that (i) crosses the optical axis of the pickup system, (ii) contains the end portion of the reflection member, and (iii) is perpendicular to the optical axis,
the wavelength conversion layer has a third light exiting surface with a tilt with respect to at least one of the first light exiting surface and the second light exiting surface, and
the third light exiting surface crosses the optical axis of the pickup system, faces the light incident surface, and coincides with the plane containing the end portion of the reflection member.

2. The light source device according to claim 1, wherein:
a heat dissipation member is provided on an opposite side of the reflection member to the wavelength conversion layer in a direction crossing the optical axis of the pickup system,
the wavelength conversion layer has a connecting surface connecting the light incident surface and the light exiting surface, and
at least a part of the reflection surface of the reflection member is provided in contact with the connecting surface.

3. A projector comprising:
the light source device according to claim 2;
a light modulation device that modulates a light output from the light source device according to image information and generates an image light; and
a projection system that projects the image light.

4. The light source device according to claim 1, further comprising a light-transmissive member in contact with the light incident surface between the excitation light source and the wavelength conversion layer,
wherein the light-transmissive member includes a convex surface that projects in a direction opposite to a traveling direction of the excitation light from the excitation light source.

5. A projector comprising:
the light source device according to claim 4;
a light modulation device that modulates a light output from the light source device according to image information and generates an image light; and
a projection system that projects the image light.

6. The light source device according to claim 4, wherein a dichroic film is provided on the light incident surface of the wavelength conversion layer.

7. The light source device according to claim 1, wherein one of the first light exiting surface and the second light exiting surface crosses the optical axis.

8. The light source device according to claim 7, wherein the other of the first light exiting surface and the second light exiting surface is along the optical axis.

9. A projector comprising:
the light source device according to claim 8;
a light modulation device that modulates a light output from the light source device according to image information and generates an image light; and
a projection system that projects the image light.

10. A projector comprising:
the light source device according to claim 7;
a light modulation device that modulates a light output from the light source device according to image information and generates an image light; and
a projection system that projects the image light.

11. A projector comprising:
the light source device according to claim 1;
a light modulation device that modulates a light output from the light source device according to image information and generates an image light; and
a projection system that projects the image light.

12. The light source device according to claim 1, wherein the reflection surface of the reflection member is parallel to the optical axis of the pickup system.

13. The light source device according to claim 1, wherein the focal point of the pickup system is located closer to the pickup system than the light incident surface of the wavelength conversion layer.

14. The light source device according to claim 13, wherein the focal point of the pickup system is located farther from the excitation light source than the light incident surface of the wavelength conversion layer.

15. The light source device according to claim 1, wherein the focal point of the pickup system is located farther from the excitation light source than the light incident surface of the wavelength conversion layer.

* * * * *